United States Patent
Aurongzeb et al.

(10) Patent No.: US 12,547,218 B2
(45) Date of Patent: Feb. 10, 2026

(54) SUSTAINABLE SYSTEM AND METHOD OF ASSEMBLING A MULTIFUNCTIONAL UPGRADEABLE AND EXPANDABLE MODULAR KEYBOARD

(71) Applicant: Dell Products, LP, Round Rock, TX (US)

(72) Inventors: Deeder M. Aurongzeb, Austin, TX (US); Weijong Sheu, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 168 days.

(21) Appl. No.: 18/385,722

(22) Filed: Oct. 31, 2023

(65) Prior Publication Data
US 2025/0138591 A1   May 1, 2025

(51) Int. Cl.
| | |
|---|---|
| *G06F 1/16* | (2006.01) |
| *G06F 1/26* | (2006.01) |
| *G06F 3/044* | (2006.01) |
| *G06F 3/04817* | (2022.01) |
| *G06F 3/0488* | (2022.01) |
| *H02J 7/35* | (2006.01) |

(52) U.S. Cl.
CPC .......... *G06F 1/1662* (2013.01); *G06F 1/1632* (2013.01); *G06F 1/26* (2013.01); *G06F 3/044* (2013.01); *G06F 3/04817* (2013.01); *G06F 3/0488* (2013.01); *H02J 7/35* (2013.01); *H02J 2300/24* (2020.01)

(58) Field of Classification Search
USPC .................................................... 361/679.09
See application file for complete search history.

(56) References Cited

U.S. PATENT DOCUMENTS

| | | | |
|---|---|---|---|
| 3,482,241 A | 12/1969 | Johnson | |
| 5,865,546 A * | 2/1999 | Ganthier | ................ H01H 13/86 400/489 |

(Continued)

FOREIGN PATENT DOCUMENTS

CN         201993709 U  *  9/2011  ............... G06F 3/02

*Primary Examiner* — Hung S. Bui
(74) *Attorney, Agent, or Firm* — Prol Intellectual Property Law, PLLC; H. Kenneth Prol

(57) ABSTRACT

A multifunctional upgradeable and expandable modular keyboard comprising a keyboard layout structure module having a plurality of keys and operatively coupled to a docking module via a docking module data and power connector and a releasable docking module fastener track and the keyboard layout structure module operatively coupled to a multifunctional modular peripheral input device via a peripheral input device fastener track and a peripheral input device data and power connector where the docking module houses a keyboard controller for communication of keystroke actuation to an information handling system and a keyboard battery. Plural sides of the releasable docking module fastener track slidingly couple the docking module and the keyboard layout structure module. Plural sides of the peripheral input device fastener track slidingly couple the multifunctional modular peripheral input device and the keyboard layout structure module. The docking module may further receive an interchangeable functional expansion module.

20 Claims, 13 Drawing Sheets

(56) References Cited

U.S. PATENT DOCUMENTS

| | | | |
|---|---|---|---|
| 6,111,527 A | 8/2000 | Susel | |
| 6,739,774 B1* | 5/2004 | Lahr | G06F 3/0221 |
| | | | 400/495 |
| 7,514,900 B2 | 4/2009 | Sander | |
| 8,004,113 B2 | 8/2011 | Sander | |
| 8,648,493 B2 | 2/2014 | Park | |
| 9,948,109 B2 | 4/2018 | Lee | |
| 10,754,603 B2 | 8/2020 | Bernstein | |
| 11,221,749 B2 | 1/2022 | Wallace | |
| 2008/0304222 A1* | 12/2008 | Chen | G06F 1/1616 |
| | | | 361/679.55 |
| 2017/0090516 A1* | 3/2017 | Ku | H02J 7/0042 |
| 2019/0279541 A1* | 9/2019 | Garza | G09F 13/0445 |
| 2022/0187870 A1 | 6/2022 | Hotelling | |
| 2023/0106903 A1* | 4/2023 | Wallace | G06F 1/1654 |
| | | | 345/168 |

\* cited by examiner

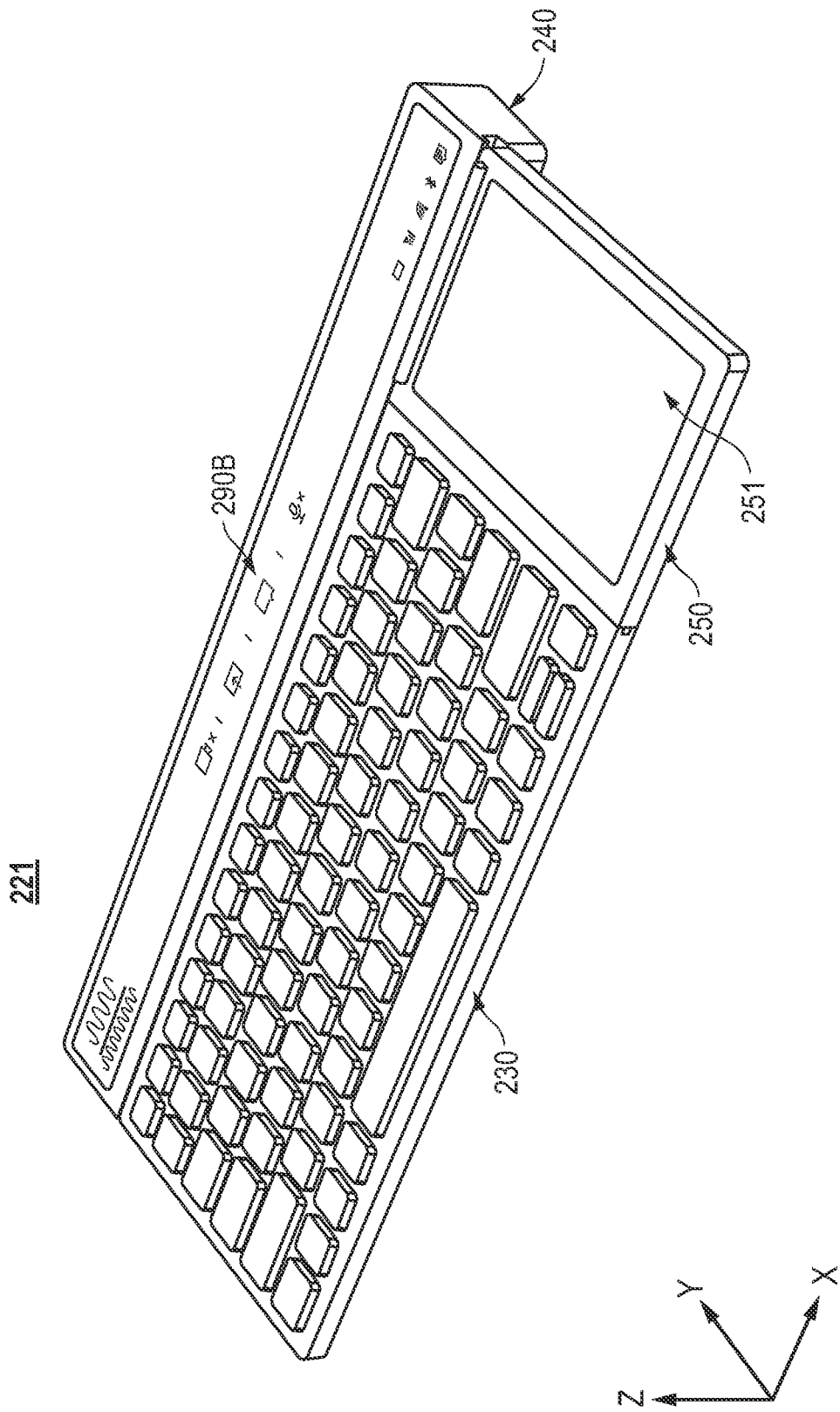

TOP PERSPECTIVE EXPLODED VIEW

TOP PERSPECTIVE EXPLODED VIEW

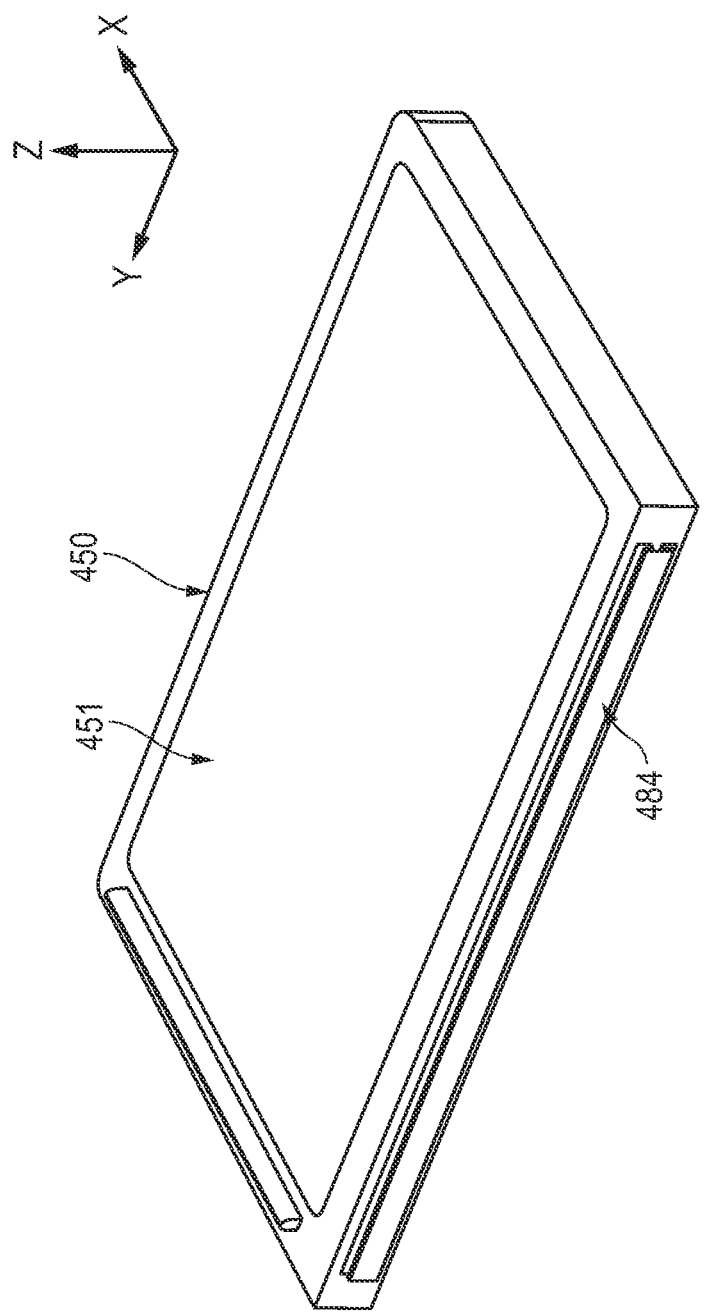

BOTTOM PERSPECTIVE VIEW

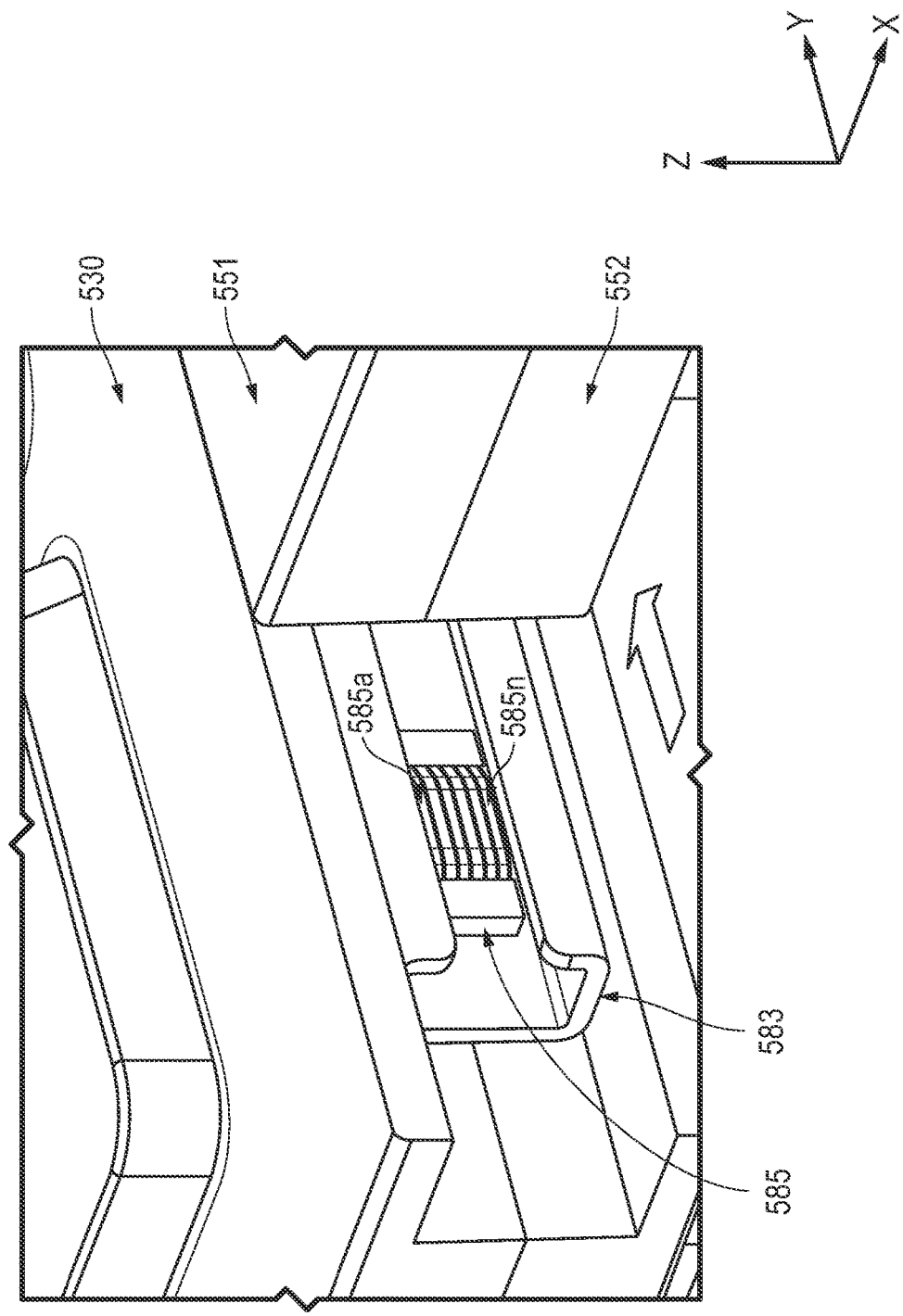

SUSTAINABLE SYSTEM AND METHOD OF ASSEMBLING A MULTIFUNCTIONAL UPGRADEABLE AND EXPANDABLE MODULAR KEYBOARD

FIELD OF THE DISCLOSURE

The present disclosure generally relates to assembly of a keyboard for an information handling system. More specifically, the present disclosure relates to the sustainable assembly, upgrade and functional expansion of a keyboard with modular, interchangeable components for decreasing waste caused by disposal of an entire keyboard assembly due to a user's wish to repair, upgrade, or expand individual features.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors or a wireless radio for interfacing with peripheral input/output devices that may also include a keyboard, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2C is a graphical diagram illustrating top perspective view of a multifunctional upgradeable and expandable modular keyboard including a touch actuated icon panel interchangeable functional expansion module according to an embodiment of the present disclosure;

FIG. 4A is a graphical diagram illustrating top perspective view of a multifunctional modular peripheral input device including a touch pad surface according to an embodiment of the present disclosure;

FIG. 5B is a graphical diagram illustrating top perspective view of operative coupling of two interchangeable components of the multifunctional upgradeable and expandable modular keyboard via a fastener according to an embodiment of the present disclosure;

The use of the same reference symbols in different drawings may indicate similar or identical items.

DETAILED DESCRIPTION OF THE DRAWINGS

Figure 1:
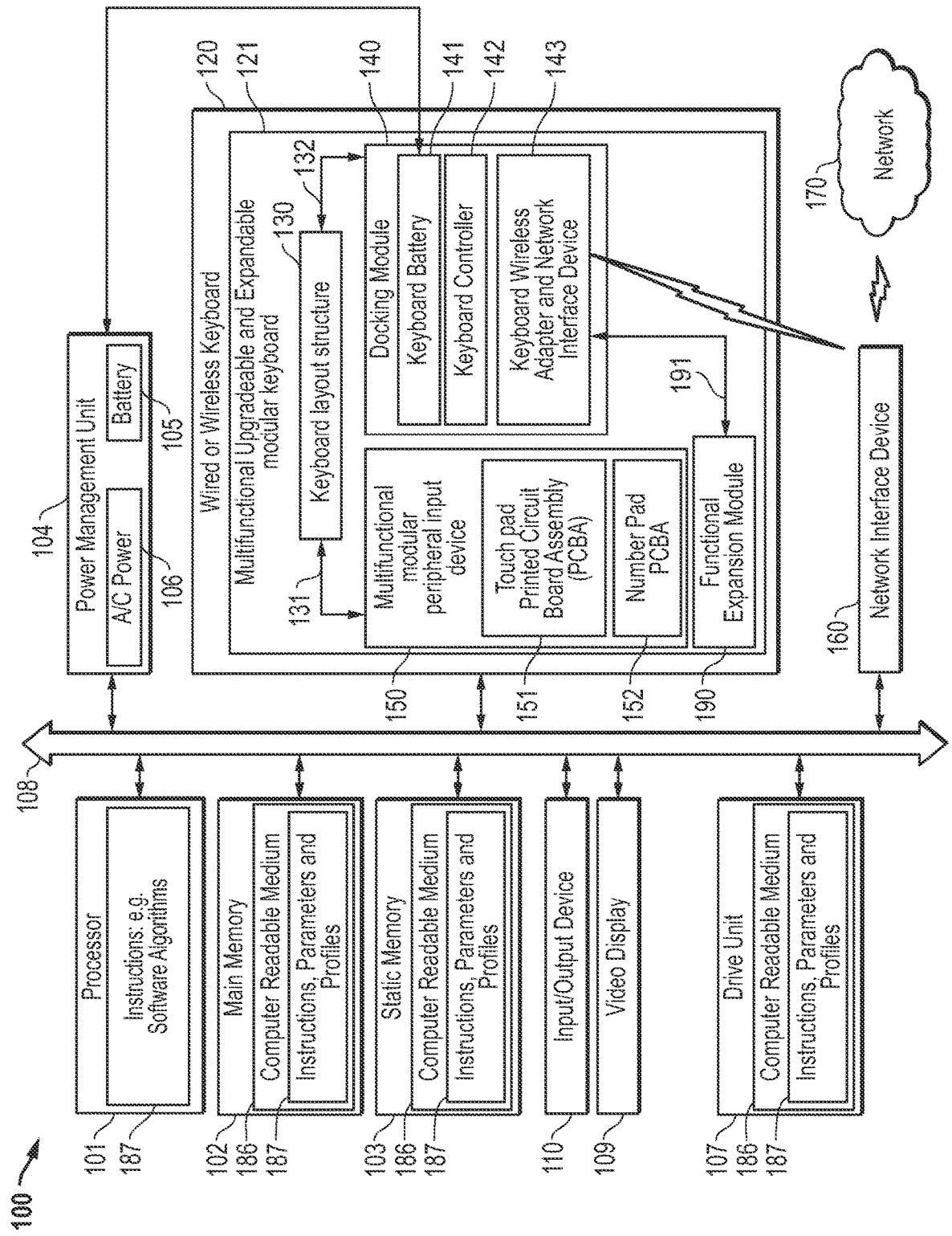
FIG. 1 is a block diagram illustrating an information handling system operatively coupled to a multifunctional upgradeable and expandable modular keyboard according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Keyboard assemblies for information handling systems may include multiple components that break or become ready for upgrade at different times than other of such components, or as new components with additional functionality may become available. For example, keyboard assemblies in existing systems may include the keyboard layout structure, power source, connectivity components such as network interface devices, input devices such as touchpad or number pad, or an icon panel indicating operation of one or more software applications executing at the information handling system. A user's needs and preferences for functionality of these various components may vary throughout the lifetime of the keyboard or portions may degrade or break such as keys, connectors, track pads, or wireless systems. Additionally, the user may wish to upgrade the keyboard as newer functionalities become available. A solution is needed that allows a user to modify or reconfigure portions or modules of a keyboard for multiple component functionalities and to include replacement or upgraded components when they become available, without disposing of and replacing the entire keyboard assembly.

The multifunctional upgradeable and expandable modular keyboard in embodiments of the present disclosure may address these issues by operatively coupling a plurality of easily interchangeable multifunctional components according to a plurality of available configurations to provide various functionalities. These interchangeable multi-functional components may be replaced without or with minimal need for tools. In embodiments, such a multifunctional upgradeable and expandable modular keyboard may include a docking module housing a keyboard controller, a network interface device for communication with an information handling system, power sources, and an opening for insertion of an interchangeable functional expansion module having one of various functionalities. The docking module in embodiments may operatively couple with one of a plurality of different types of keyboard layout structure modules via a docking module fastener track and a docking module data and power connector for the transfer of power and data between the docking module and the keyboard layout structure module.

The keyboard layout structure module, having a plurality of keys for the keyboard, in embodiments of the present disclosure may also operatively couple with a multifunctional modular peripheral input device via a peripheral input device fastener track and a peripheral input device data and power connector for the transfer of power and data between the keyboard layout structure and the multifunctional modular peripheral input device. In various embodiments herein, the multifunctional modular peripheral input device may comprise a single peripheral device that is interchangeable with other modular peripheral input devices or a plurality of peripheral input devices, such as a touch pad and a number pad in the same attachable unit. In a particular embodiment, a first peripheral input device, such as a touch pad, may be situated on a first surface of the multifunctional modular peripheral input device and a second peripheral input device, such as a number pad, may be situated on a second surface. A user in such embodiments may enable functionality of the first or second of such peripheral input devices by orienting either the first surface or the second surface of the multifunctional modular peripheral device to point upward toward the user, respectively, prior to operative coupling with the keyboard layout structure and thus engaging the peripheral input device data and power connector differently in each orientation. In some embodiments, the multifunctional modular peripheral device may have plural power and data connectors to operatively couple with the keyboard layout structure module such that in a first orientation with a first surface facing up uses a different data and power connector than the orientation with the second surface facing up.

A user may also configure the multifunctional upgradeable and expandable modular keyboard to include various additional functionalities, such as a touch icon panel or a solar charging panel, for example, by insertion of one of a plurality of available interchangeable functional expansion modules within the docking module. Each of the interchangeable functional expansion modules may provide a separate functionality and may have a universal size, shape, and connectivity for operative coupling with the docking module in an opening and connector thereon to receive the interchangeable functional expansion modules in various embodiments. The interchangeable functional expansion module in embodiments may be operatively coupled with the docking module through insertion within an opening of the docking module sized to receive the interchangeable functional expansion module and via an expansion module data and power connector for transfer of data and power between the interchangeable functional expansion module and the docking module. In such a way, the user may mix and match a plurality of different types of keyboard layout structures, a plurality of different docking modules, a plurality of different peripheral input devices, and a plurality of upgradeable additional functionalities of functional expansion modules, as the systems break or a user's needs change throughout the lifetime of the multifunctional upgradeable and expandable modular keyboard.

FIG. 1 illustrates an information handling system 100 according to several aspects of the present disclosure. In various embodiments described herein, a multifunctional upgradeable and expandable modular keyboard 121 of a wired or wireless keyboard 120 may be operatively coupled to the information handling system 100 such that components of the multifunctional upgradeable and expandable modular keyboard 121 having various different functionalities may be removable and replaceable with respect to other components of the multifunctional upgradeable and expandable modular keyboard 121 and with no tools or very few tools. This may allow for a user to easily repair and to mix and match a plurality of different types of keyboard layout structure modules 130, a plurality of docking modules 140, a plurality of different multifunctional modular peripheral input devices 150, and a plurality of upgradeable additional functionalities of functional expansion modules 190. The user may easily replace any broken components in any of the above modules, such as connectors, batteries, keyboard keys, or others to upgrade them as the user's needs change throughout the lifetime of the multifunctional upgradeable and expandable modular keyboard 121.

The multifunctional upgradeable and expandable modular keyboard 121 in an embodiment may operatively couple a plurality of interchangeable multifunctional components according to a plurality of available configurations to provide various combinations of functionalities. In an embodiment, such a multifunctional upgradeable and expandable modular keyboard 121 may include a docking module 140 housing a keyboard controller 142, a keyboard wireless adapter and network interface device 143 for wireless communication with an information handling system 100, a keyboard battery 141 for powering the keyboard controller 142 wired network interface device or other port connectors for wired communication and power, any printed circuit board assemblies (PCBs) of a multifunctional modular peripheral input device 150, and various types of interchangeable functional expansion modules 190. The docking module 140 in an embodiment may operatively couple with one of a plurality of different types of keyboard layout structure modules 130 via a docking module fastener track and a docking module data and power connector 132 for the transfer of power and data between the docking module 140 and the keyboard layout structure 130.

The keyboard layout structure 130 in an embodiment is an array of keyboard keys in a module with an array of key switch or keypress detectors, and fastener tracks and data and power connectors for operative coupling to other modules of the multifunctional upgradeable and expandable modular keyboard 121. The keyboard layout structure 130 in an embodiment may also operatively couple with a multifunctional modular peripheral input device 150 via a peripheral input device fastener track and a peripheral input device data and power connector 131 for the transfer of power and data between the keyboard layout structure module 130 and the multifunctional modular peripheral input device 150. In various embodiments herein, the multifunctional modular peripheral input device 150 may comprise a plurality of peripheral input devices, such as a touch pad and a number pad in one unit. In some embodiments, the multifunctional modular peripheral input device 150 may further house one or more PCBs 151 and 152 for each of the plurality of peripheral input devices housed therein, such as a touch pad PCB 151 and a number pad 152. In other embodiments, operation of the multifunctional modular peripheral input device 150 may be directed via the keyboard controller 142, or the PCBs 151 or 152 may be housed within the docking module 140. In a particular embodiment, a first peripheral input device, such as a touch pad, may be situated on a first surface of the multifunctional modular peripheral input device 150 and a second peripheral input device, such as a number pad, may be situated on a second surface. A user in such an embodiment may enable functionality of the first or second of such peripheral input devices by orienting either the first surface or the second surface of the multifunctional modular peripheral device to point upward toward the user, respectively, prior to operative coupling with the keyboard layout structure module 130. How the peripheral input device data and power connector 131 pins are oriented or which peripheral input device data and power connecter 131 among a plurality of the same is engaged may indicate how the multifunctional peripheral input device 150 is oriented to a keyboard controller 142 in an embodiment.

A user may also configure the multifunctional upgradeable and expandable modular keyboard 121 to include various additional functionalities, such as a touch icon panel or a solar charging panel, for example, by insertion of one of a plurality of available interchangeable functional expansion modules 190 within the docking module 140. Each of the interchangeable functional expansion modules 190 may provide a separate functionality and may have a universal size, shape, and connectivity for operative coupling with the docking module 140 in an embodiment. The interchangeable functional expansion module 190 in an embodiment may be operatively coupled with the docking module 140 through insertion within an opening of the docking module 140 sized to receive the interchangeable functional expansion module 190 and via an expansion module data and power connector 191 for transfer of data and power between the interchangeable functional expansion module 190 and the docking module 140. In such a way, the user may mix and match a plurality of different types of keyboard layout structure modules 130, a plurality of different docking modules 140, a plurality of different multifunctional modular peripheral input devices 150, and a plurality of upgradeable additional functionalities of functional expansion modules 190, as the user's needs change throughout the lifetime of the multifunctional upgradeable and expandable modular keyboard 121 or component repair so replacement is needed.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, a keyboard 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, wired or wireless keyboard 120, or other components of an information handling system. Battery 105 or A/C power adapter 106 may be operatively coupled to the keyboard battery 141 via an electrically conductive wire if the keyboard 120 is wired. In an alternative embodiment, keyboard 120 may be wireless and be powered with a keyboard battery 141 that is rechargeable or a replaceable dry cell battery. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The wireless adapter and network interface device 160 may provide connectivity of the information handling system 100 to wireless peripheral devices such as keyboard 120 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2A:
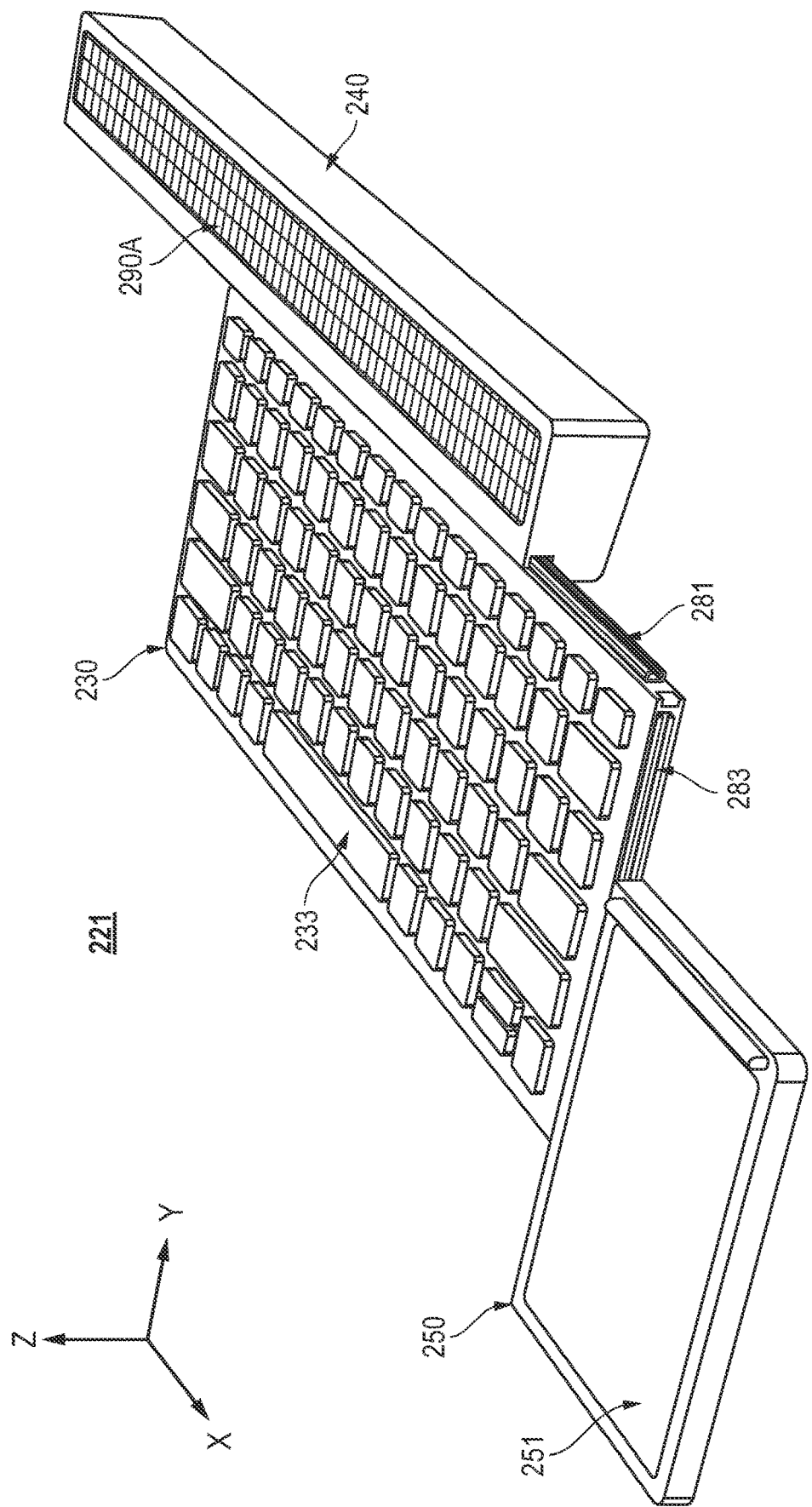
FIG. 2A is a graphical diagram illustrating top perspective view of a partially assembled multifunctional upgradeable and expandable modular keyboard according to embodiments of the present disclosure.

FIG. 2A is a graphical diagram illustrating top perspective view of interchangeable and upgradeable components partially assembled into a multifunctional upgradeable and expandable modular keyboard according to an embodiment of the present disclosure. As described herein, the multifunctional upgradeable and expandable modular keyboard 221 in an embodiment may be formed through operative coupling of a plurality of interchangeable multifunctional components according to a plurality of available configurations to provide various functionalities. In an embodiment, such a multifunctional upgradeable and expandable modular keyboard 221 may include a docking module 240 housing a keyboard controller, a network interface device for wired or wireless communication with an information handling system, any external port connectors and an opening for insertion of an interchangeable functional expansion module 290 having one of various functionalities. The docking module 240 in an embodiment may operatively couple with one of a plurality of different types of keyboard layout structure modules 230 housing a plurality of keys 233, via a docking module fastener track first side 281. Different types of keyboard layout structure modules 230 in an embodiment may include a layout of keyboard keys 233 having various types of key layouts or assemblies, such as haptic, dome, scissor, short-stroke, or long stroke, or key feature such as colors, backlighting, texture, sound levels or others. The keyboard layout structure modules 230 may include array of key switches or other keypress detector structures, backlighting, controllers or other functional components.

The keyboard layout structure module 230 in an embodiment may also operatively couple with a multifunctional modular peripheral input device 250 via a peripheral input device fastener track 283. In various embodiments herein, the multifunctional modular peripheral input device 250 may comprise a single peripheral device or a plurality of peripheral input devices, such as a touch pad 251 or a number pad (not shown). In a particular embodiment, a first peripheral input device, such as a touch pad 251, may be situated on a first surface of the multifunctional modular peripheral input device 250 and a second peripheral input device, such as a number pad, may be situated on a second surface of the multifunctional modular peripheral input device 250, as described in greater detail below with respect to FIG. 4B. A user in such an embodiment may enable functionality of the first or second of such peripheral input devices by orienting either the first surface or the second surface of the multifunctional modular peripheral device 250 to point upward toward the user, respectively, prior to operative coupling with the keyboard layout structure 230.

A user may also configure the multifunctional upgradeable and expandable modular keyboard 221 to include various additional functionalities, such as a touch icon panel or a solar charging panel, for example, by insertion of one of a plurality of available interchangeable functional expansion modules 290A within the docking module 240. Each of the interchangeable functional expansion modules 290A may provide a separate functionality and may have a universal size, shape, and connectivity for operative coupling with the docking module 240 in an embodiment. For example, the first interchangeable functional expansion module 290A in an embodiment described with respect to FIG. 2A may include a photovoltaic cell array for solar charging and recharging of a keyboard battery housed within the docking module 240. The interchangeable functional expansion module 290A in an embodiment may be operatively coupled with the docking module 240 through insertion within an opening of the docking module 240 sized to receive the interchangeable functional expansion module 290A and via an expansion module data and power connector (not shown) for transfer of data and power between the interchangeable functional expansion module 290A and the docking module 240, as described in greater detail below with respect to FIGS. 3A and 3B. In such a way, the user may easily repair or replace and optionally mix or match a plurality of different types of keyboard layout structure modules 230, a plurality of docking modules 240, a plurality of different multifunctional modular peripheral input devices 250, and a plurality of upgradeable additional functionalities of functional expansion modules 290A, as the user's needs change or repairs are required throughout the lifetime of the multifunctional upgradeable and expandable modular keyboard 221.

Figure 2B:
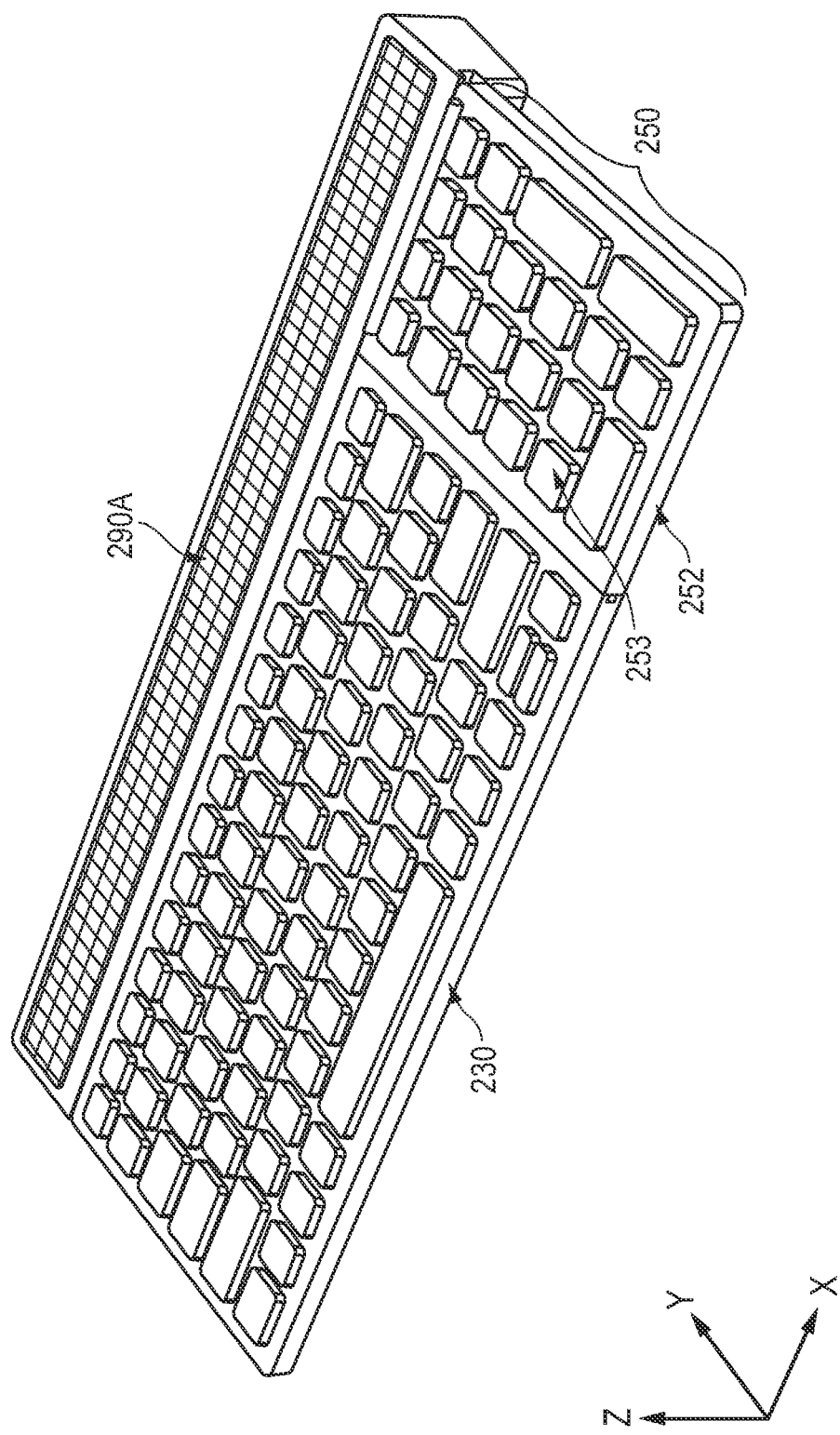
FIG. 2B is a graphical diagram illustrating top perspective view of a multifunctional upgradeable and expandable modular keyboard assembled for use with a number pad and a solar charging interchangeable functional expansion module according to an embodiment of the present disclosure.

FIG. 2B is a graphical diagram illustrating top perspective view of a multifunctional upgradeable and expandable modular keyboard assembled for use with a number pad 252 portion of a multifunctional modular peripheral input device 250 and including a solar charging interchangeable functional expansion module 290A according to an embodiment of the present disclosure. As described herein, a multifunctional modular peripheral input device 250 may be formed in an embodiment to include a number pad second surface 252, including a plurality of non-QWERTY keys 253. In another embodiment, the multifunctional modular peripheral input device 250 may be formed to include a touch pad assembly with a capacitive touch surface in the same unit on an opposite side of the multifunctional modular peripheral input device 250. A user in an embodiment may enable functionality of the number pad 252 by orienting the second surface number pad 252 of the multifunctional modular peripheral device 250 to point upward toward the user, prior to operative coupling with the keyboard layout structure 230.

FIG. 2C is a graphical diagram illustrating top perspective view of a multifunctional upgradeable and expandable modular keyboard assembled for use with a touch pad portion of a multifunctional modular peripheral input device and with a touch actuated icon panel interchangeable functional expansion module 290B according to an embodiment of the present disclosure. As described herein, a multifunctional modular peripheral input device 250 may be formed in an embodiment to include a touch pad 251 assembly with a capacitive touch surface on the multifunctional modular peripheral input device 250, a number pad second surface on the same unit that is interchangeable. A user in an embodiment may enable functionality of the touch pad 251 by orienting the first surface with touch pad 251 of the multifunctional modular peripheral device 250 to point upward toward the user, prior to operative coupling with the keyboard layout structure 230. A second interchangeable functional expansion module 290B may be formed in another embodiment shown in FIG. 2C such that it is sized for insertion within the expansion module insertion opening of the docking module 240. The second interchangeable functional expansion module 290B in an embodiment may include a plurality of press or touch actuated software application icons or other interaction buttons or icons as well as an LCD or OLED information screen.

Figure 3A:
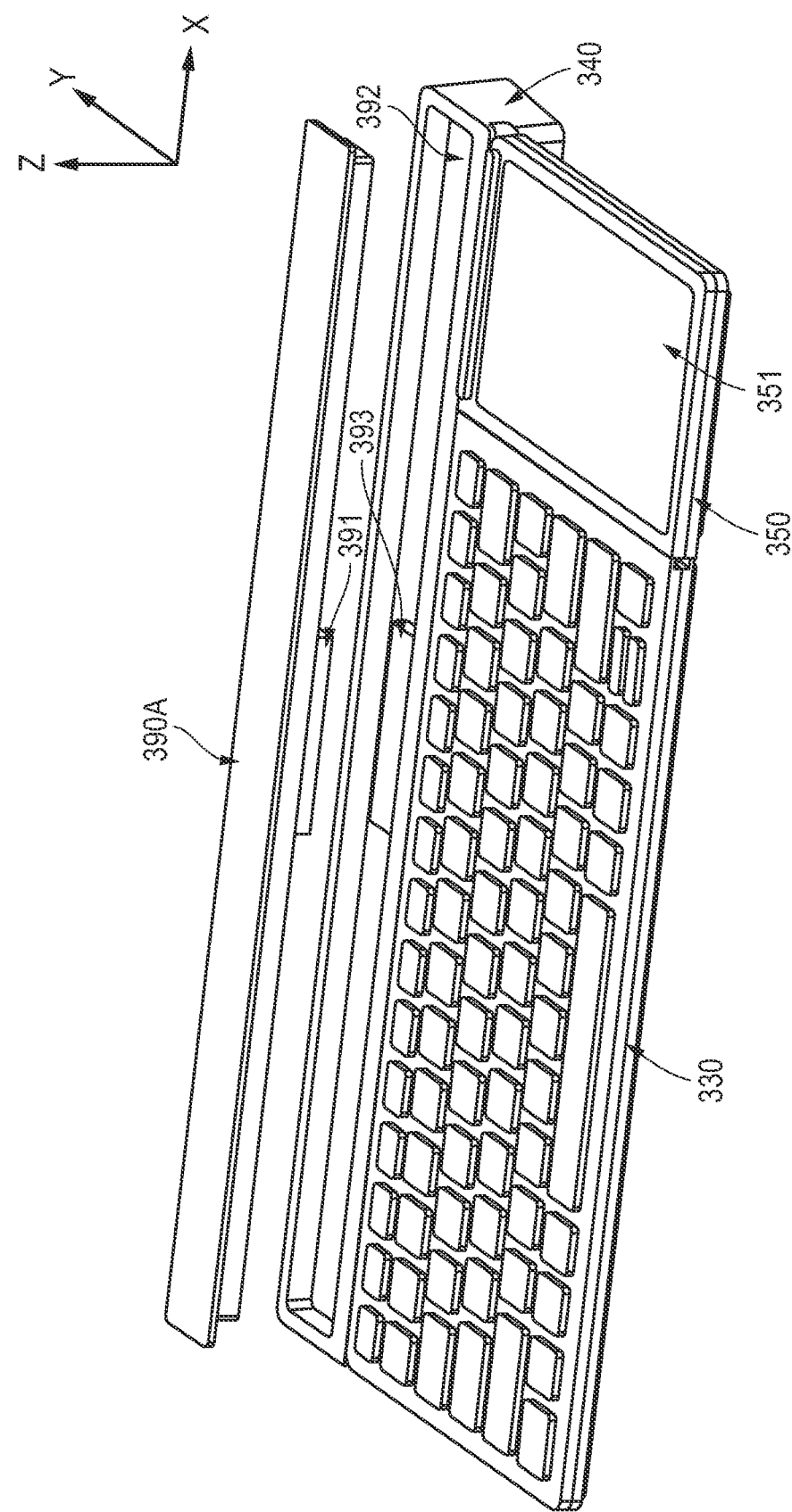
FIG. 3A is a graphical diagram illustrating top perspective exploded view of a docking module allowing for insertion and operative coupling with a first user upgradeable and interchangeable functional expansion module according to an embodiment of the present disclosure.

FIG. 3A is a graphical diagram illustrating top perspective exploded view of a multifunctional upgradeable and expandable modular keyboard including a docking module allowing for insertion and operative coupling with a first user interchangeable functional expansion module according to an embodiment of the present disclosure. As described herein, a keyboard layout structure module 330 in an embodiment may be operatively coupled to a multifunctional modular peripheral input device 350, which may include one or more peripheral input devices such as a touch panel 351 as shown, and to a docking module 340. As also described herein, the docking module 340 in an embodiment may be operatively coupled to one of a plurality of interchangeable functional expansion modules, including a solar panel interchangeable functional expansion module 390A, via operative coupling between first and second sides of an expansion module data and power connector 391 and 393.

A first interchangeable functional expansion module 390A may be formed in an embodiment such that it is sized for insertion within the expansion module insertion opening 392 of the docking module 340. In an embodiment, the first interchangeable functional expansion module 390A may include a solar charging photovoltaic cell array for charging the keyboard rechargeable battery housed within the docking module 340. The first interchangeable functional expansion module 390A in an embodiment may also include a second side of the expansion module data and power connector 391 for operative coupling of the first interchangeable functional expansion module 390A and the docking module 340. The docking module 340 in an embodiment may further house a first side of the expansion module data and power connector 393 for operative coupling with the second side of the expansion module data and power connector 391 to enable the transfer of power and data between the docking module 340 and the first interchangeable functional expansion module 390A. Upon insertion of the first interchangeable functional expansion module 390A within the expansion module insertion opening 392, a plurality of magnets or corresponding ferromagnetic plates within the expansion module insertion opening 392 and on the first interchangeable functional expansion module 390A may fasten the first interchangeable functional expansion module 390A to the docking module 340.

Figure 3B:
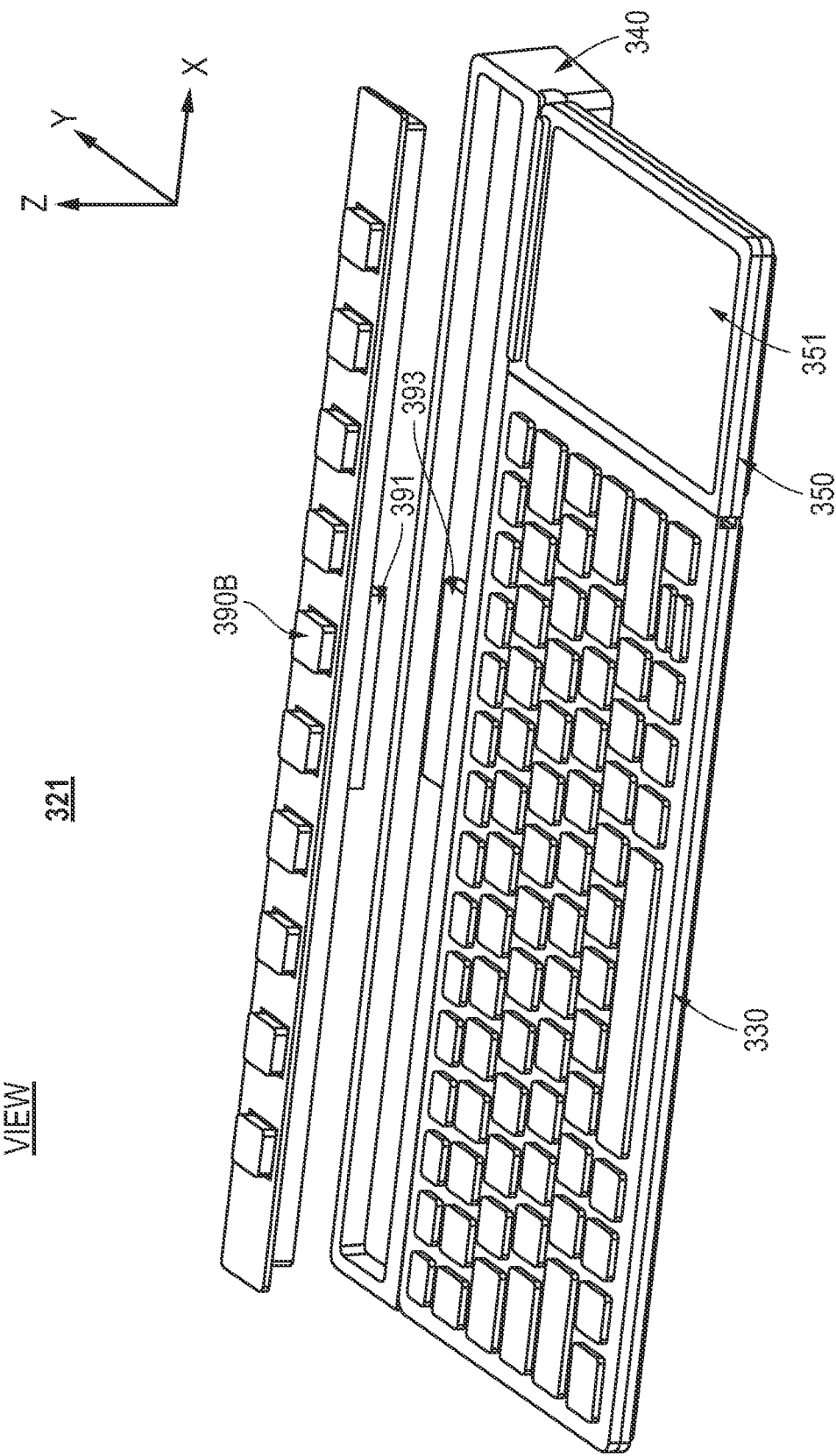
FIG. 3B is a graphical diagram illustrating top perspective exploded view of a docking module allowing for insertion and operative coupling with a second user upgradeable and interchangeable functional expansion module according to an embodiment of the present disclosure.

FIG. 3B is a graphical diagram illustrating top perspective exploded view of a multifunctional upgradeable and expandable modular keyboard including a docking module allowing for insertion and operative coupling with a second user upgradeable and interchangeable functional expansion module according to an embodiment of the present disclosure. As described herein, a keyboard layout structure module 330 in an embodiment may be operatively coupled to a multifunctional modular peripheral input device 350, which may include a touch panel 351, and to a docking module 340. As also described herein, the docking module 340 in an embodiment may be operatively coupled to one of a plurality of interchangeable functional expansion modules, including a touch icon interchangeable functional expansion module 390B, via operative coupling between first and second sides of an expansion module data and power connector 391 and 393.

A second interchangeable functional expansion module 390B may be formed in an embodiment such that it is sized for insertion within the expansion module insertion opening 392 of the docking module 340. In an embodiment, the second interchangeable functional expansion module 390B housed within the docking module 340 and may include a plurality of touch actuated icons or buttons representing functionality of one or more software applications executing at a processor of the information handling system. The second interchangeable functional expansion module 390B in an embodiment may also include a second side of the expansion module data and power connector 391 for operative coupling of the second interchangeable functional expansion module 390B and the docking module 340. The docking module 340 in an embodiment may further house a first side of the expansion module data and power connector (not shown) for operative coupling with the second side of the expansion module data and power connector 391 to enable the transfer of power and data between the docking module 340 and the second interchangeable functional expansion module 390B. Upon insertion of the second interchangeable functional expansion module 390B within the expansion module insertion opening 392, a plurality of magnets, corresponding ferromagnetic plates located within the expansion module insertion opening 392 and on the second interchangeable functional expansion module 390B, or interference friction fit between the expansion module insertion opening 392 and the second interchangeable functional expansion module 390B may fasten the second interchangeable functional expansion module 390B to the docking module 340.

FIG. 4A is a graphical diagram illustrating top perspective view of a multifunctional modular peripheral input device including a touch pad surface for operative coupling with a keyboard layout structure module according to an embodiment of the present disclosure. As described herein, a multifunctional modular peripheral input device 450 may be formed in an embodiment to include a touch pad 451 assembly first surface with a capacitive touch surface, and a number pad second surface (not shown) in a simple, interchangeable unit. A user, in an embodiment, may enable functionality of the touch pad 451 by orienting the first surface touch pad 451 of the multifunctional modular peripheral device 450 to point upward toward the user, prior to operative coupling with the keyboard layout structure (not shown). The multifunctional modular peripheral input device 450 in an embodiment may further include a second side of a peripheral input device fastener track 484 for operative coupling with a first side of the peripheral input device fastener track (283 of FIG. 2A) of the keyboard layout structure. In the embodiment of FIG. 4A, the peripheral input device fastener track 484 is an H-channel sliding track. In other embodiments, the peripheral input device fastener track 484 may be a C-channel sliding track socket. Other types of peripheral input device fastener track 484 are also contemplated in other embodiments.

Figure 4B:
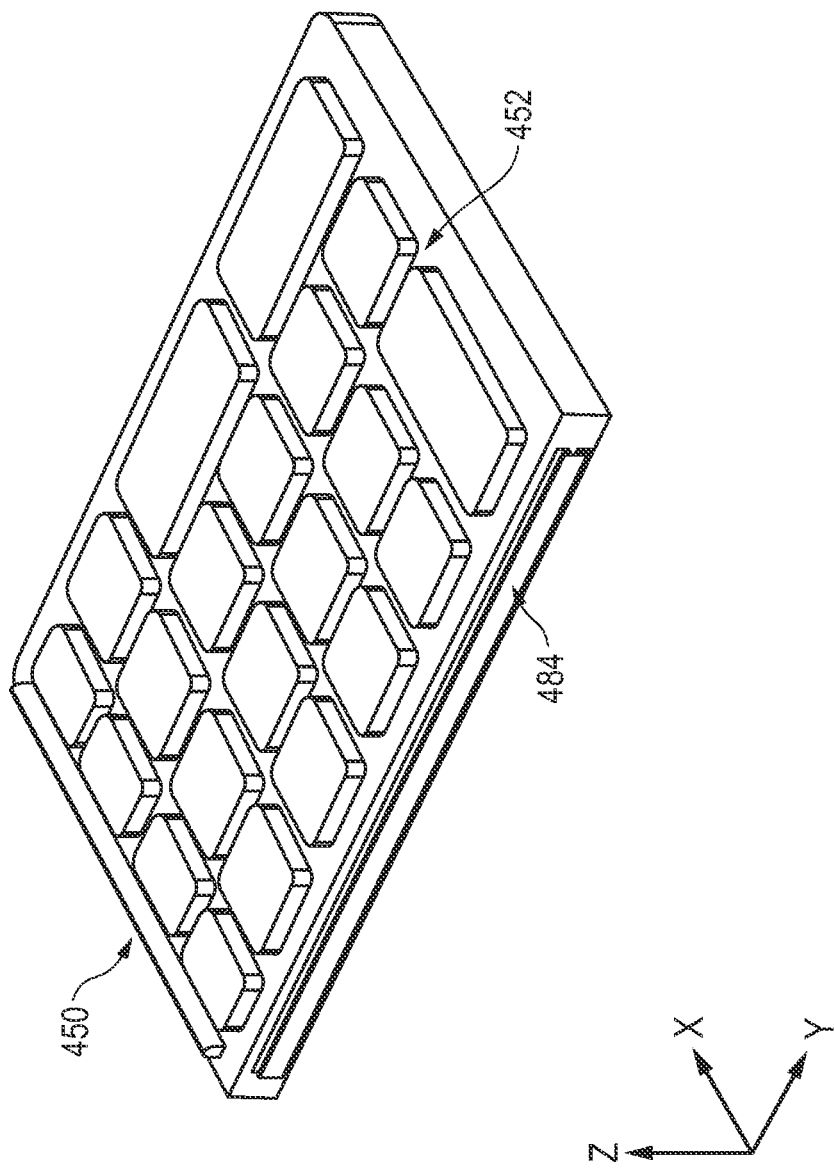
FIG. 4B is a graphical diagram illustrating top perspective view of a multifunctional modular peripheral input device including a number pad surface according to an embodiment of the present disclosure.

FIG. 4B is a graphical diagram illustrating top perspective view of a multifunctional modular peripheral input device including a number pad surface for operative coupling with a keyboard layout structure according to an embodiment of the present disclosure. As described herein, a multifunctional modular peripheral input device 450 may be formed in an embodiment to include a number pad 452 assembly second surface with a plurality of non-QWERTY, additional keys, or number keys, and a touch pad first surface oriented underneath (not shown). A user in an embodiment may enable functionality of the number pad 452 by orienting the second surface number pad 452 of the multifunctional modular peripheral device 450 to point upward toward the user, prior to operative coupling with the keyboard layout structure (not shown). The multifunctional modular peripheral input device 450 in an embodiment may further include a second side of a peripheral input device fastener track 484 for operative coupling a first side of the peripheral input device fastener track (283 of FIG. 2A) of the keyboard layout structure. In the embodiment of FIG. 4B, the peripheral input device fastener track 484 is an H-channel sliding track. In other embodiments, the peripheral input device fastener track 484 may be a C-channel sliding track socket. Other types of peripheral input device fastener track 484 are also contemplated in other embodiments.

Figure 5A:
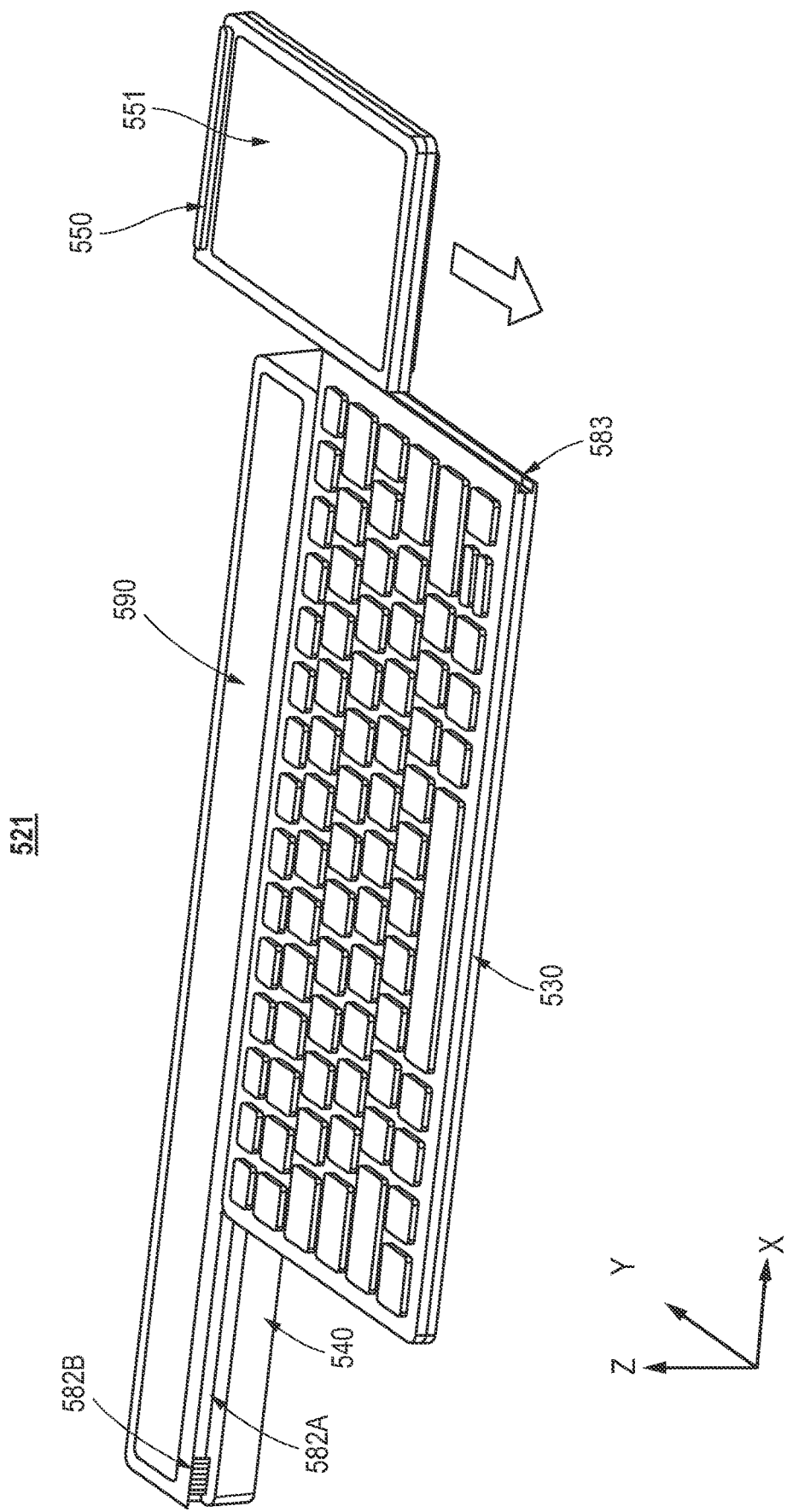
FIG. 5A is a graphical diagram illustrating top perspective view of partial operative coupling of a keyboard layout structure, docking module, and a multifunctional modular peripheral input device according to an embodiment of the present disclosure.

FIG. 5A is a graphical diagram illustrating top perspective view of partial operative coupling of a keyboard layout structure module, docking module with an interchangeable functional expansion module, and a multifunctional modular peripheral input device to form a multifunctional upgradeable and expandable modular keyboard according to an embodiment of the present disclosure. As described herein, the multifunctional upgradeable and expandable modular keyboard 521 in an embodiment may be assembled through operative coupling of a plurality of interchangeable multi-functional components according to a plurality of available configurations to provide various functionalities and easy replacement of any interchangeable multi-functional components. Such a multifunctional upgradeable and expandable modular keyboard 521 may include a docking module 540 housing an interchangeable functional expansion module 590 having one of various functionalities. The docking module 540 may be replaceable and have a variety of external port connectors, be wired or wireless, or have a rechargeable battery in an embodiment. The docking module 540, in an embodiment, may operatively couple with one of a plurality of different types of keyboard layout structure modules 530 via a docking module fastener track 582A and a docking module data and power connector 582B for the transfer of power and data between the docking module 540 and the keyboard layout structure module 530.

As shown in FIG. 5A, assembly of the multifunctional upgradeable and expandable modular keyboard 521 in an embodiment may begin with partial insertion of a releasable docking module fastener track second side 582A within a releasable docking module fastener track first side (281 of FIG. 2A) such that the keyboard layout structure module 530 may slide generally horizontally with reference to the docking module 540. This insertion may be considered partial in the embodiment described with reference to FIG. 5A, because the left side of the keyboard layout structure 530 does not meet or lie flush with the left side of the docking module 540. During assembly of the multifunctional upgradeable and expandable modular keyboard 521, such full insertion of the releasable docking module fastener track second side 582A within the releasable docking module fastener track first side (281 of FIG. 2A) in an embodiment may be performed following operative coupling of the keyboard layout structure module 530 with the multifunctional modular peripheral input device 550.

The keyboard layout structure module 530 in an embodiment may further include a peripheral input device fastener track first side 583 for operative coupling with a multifunctional modular peripheral input device 550. The keyboard layout structure module 530 in an embodiment may be operatively coupled to the multifunctional modular peripheral input device 550, which may be a touchpad 552 in one embodiment, that has the only peripheral input device. In another embodiment, the multifunctional modular peripheral input device 550 may be a single unit incorporating a plurality of peripheral input devices, and may be oriented for use as a touch pad 551 as shown in FIG. 5A, or as a number pad. Such an operative coupling may include contact between the peripheral input device fastener track first side 583 and peripheral input device fastener track second side (484 of FIGS. 4A and 4B), for slidable movement of the multifunctional modular peripheral input device 550 with respect to the keyboard layout structure 530, as described in greater detail below with respect to FIGS. 5B and 5C. The multifunctional modular peripheral input device 550 may be fully operatively connected with the keyboard layout structure module 530 in an embodiment, such that the front edge of the multifunctional modular peripheral input device 550 is parallel to or flush with the front edge of the keyboard layout structure module 530. Upon such full operative coupling of the multifunctional modular peripheral input device 550 with the keyboard layout structure module 530 in an embodiment, the docking module may be fully operatively coupled to the keyboard layout structure by sliding the keyboard layout structure module 530 and the multifunctional modular peripheral input device 550 to the left such that the left side of the docking module 540 lies flush with the left side of the keyboard layout structure module 530. Such a positioning of the docking module 540 with respect to the keyboard layout structure module 530 may ensure full contact between the first and second sides of the releasable docking module fastener track, including 582A, and the first and second sides of the docking module data and power connector, including 582B.

FIG. 5B is a graphical diagram illustrating top perspective close up view of operative coupling of a keyboard layout structure and another interchangeable component of the multifunctional upgradeable and expandable modular keyboard of FIG. 5A via a fastener track according to an embodiment of the present disclosure. As described herein, the keyboard layout structure module 530 in an embodiment may be operatively coupled with a multifunctional modular peripheral input device 550 via operative coupling between a first and second side of a peripheral input device fastener track and between a first and second side of a peripheral input device data and power connector. FIG. 5B illustrates a peripheral input device fastener track first side 583 of the keyboard layout structure module 530 that includes a peripheral input device data and power connector 585 first side for operative coupling with a peripheral input device fastener track second side and a peripheral input device data and power connector second side (not shown in FIG. 5B), respectively, on the multifunctional modular peripheral input device 550.

The keyboard layout structure module 530 in an embodiment may be operatively coupled to the multifunctional modular peripheral input device 550 oriented for use as a touch pad 551, via operative coupling between the peripheral input device fastener track first side 583 on the keyboard layout structure module 530 and a peripheral input device fastener track second side (484 of FIGS. 4A and 4B) on the multifunctional modular peripheral input device 550, as described in greater detail below with respect to FIG. 5C. Such an operative coupling may further include contact between the peripheral input device data and power connector first side 585 mounted to the keyboard layout structure module 530 and one or more peripheral input device data and power connector second side mounted to the multifunctional modular peripheral input device 550, as is described in greater detail below with respect to FIG. 5C.

The peripheral input device fastener track and the keyboard layout structure module fastener track in an example embodiment may include a sliding track and a socket track respectively where the sliding track track slidably couples within the socket track. Either side can be a sliding track or socket track of the faster track coupling. For example, in the shown embodiment, the keyboard layout structure module fastener track first side 583 may comprise a C-channel sliding track socket for insertion therewithin of a peripheral input device fastener track second side (e.g., 484 of FIGS. 4A and 4B), which may comprise an H-channel sliding track mounted to the multifunctional modular peripheral input device 550. As another example, the releasable fastener track first side on the keyboard layout structure module 530 may comprise an H-channel sliding track for slidable insertion into a peripheral input device module fastener track second side, which may comprise a C-channel sliding track socket mounted to the multifunctional modular peripheral input device 550. The fastener track may also be used between the keyboard docking module (not shown) and the keyboard layout structure module 530 such that the C-channel sliding track socket and the H-channel sliding track may be mounted on either side to operatively coupled the keyboard docking module and the keyboard layout structure module 530 in embodiments herein. It is contemplated that other fasteners may be used to operatively couple these components, including magnets, latches, or screws, for example.

In an embodiment, the keyboard layout structure module data and power connector and the peripheral input device data and power connector in an example embodiment may include a plurality of conductive contacts for transferring power and data between operatively coupled components. For example, the keyboard layout structure module data and power connector first side 585 may comprise a first plurality of metal contacts 585a to 585n for making conductive contact with a second plurality of metal contacts (not shown) within a peripheral input device data and power connector second side mounted to the multifunctional modular peripheral input device 550, as described in greater detail with respect to FIG. 5C. Either of the keyboard layout structure module or multifunctional modular peripheral input device module 550 may have a plurality of data and power connectors similar to first side 585 each with a plurality of metal contacts similar to 585a to 585n to provide for data and power connectivity for the multifunctional modular peripheral input device module 550 via the track fastener when operatively coupled with either side facing up. As another example, data and power connectors similar to the first side 585 shown in FIG. 5B each with a plurality of metal contacts similar to 585a to 585n may be used to provide for data and power connectivity between a docking module data and power connector first side (e.g., 582B of FIG. 5A) and a keyboard layout structure module data and power connector second side in embodiments herein. The docking module data and power connector may be disposed within a docking module fastener track (582A of FIG. 5A) mounted to the docking module in one example embodiment shown in FIG. 5A, however, a C-channel fastener track may be used on either side of the fastener track coupling. In one embodiment, the plurality of metal contacts of the docking module data and power connector may be operatively coupled to the keyboard controller housed within the docking module in an embodiment and may provide data and power connectivity to the keyboard layout structure module 530 and the multifunctional modular peripheral input device module 550.

Figure 5C:
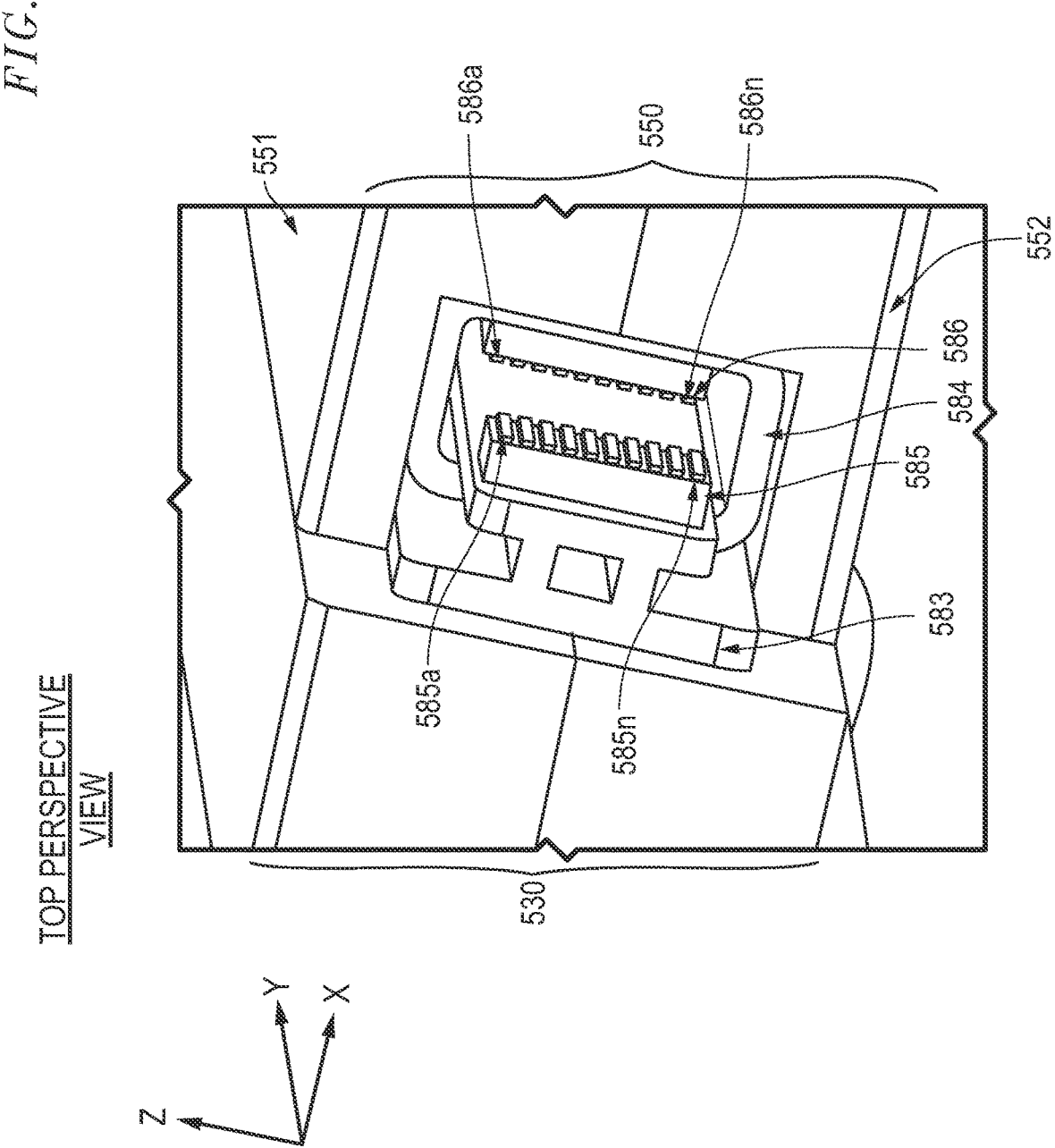
FIG. 5C is a graphical diagram illustrating top perspective view of operative coupling of two interchangeable components of the multifunctional upgradeable and expandable modular keyboard via a fastener track with a data and power connector according to an embodiment of the present disclosure.

FIG. 5C is a graphical diagram illustrating top perspective close up view of operative coupling of a keyboard layout structure module and another interchangeable component of the multifunctional upgradeable and expandable modular keyboard via a fastener track coupling and a data and power connector according to another embodiment of the present disclosure. As described herein, the keyboard layout structure module 530 in an embodiment may operatively couple with a multifunctional modular peripheral input device 550 via operative coupling between a first and second side of a fastener track coupling and between a first and second side of a data and power connector. As described above with respect to FIG. 5B, the peripheral input device fastener track first side 583 in an embodiment may be a C-channel track on the keyboard layout structure module 530, for operative coupling with an H-channel peripheral input device fastener track second side (484 of FIGS. 4A and 4B) mounted to the multifunctional modular peripheral input device 550. As also described above with respect to FIGS. 5A and 5B, the releasable docking module fastener track first side 582A may be a C-channel sliding track socket on the docking module 540 and the keyboard layout structure fastener track on the keyboard layout structure 530 (e.g., 281 of FIG. 2A) may be an H-channel releasable docking module fastener track. However, it is understood that the H-channel and C-channel fastener track sides may be mounted on either side of the fastener track coupling between the keyboard layout structure module 530 and the docking module 540. For example, in such other embodiments, the peripheral input device fastener track first side 583 in such an embodiment may be an H-channel track on the keyboard layout structure module 530 for operative coupling with a C-channel fastener track second side 584 mounted to the multifunctional modular peripheral input device 550, as described herein with respect to FIG. 5C. In another example embodiment, the releasable docking module fastener track first side may be an H-channel track on the docking module 540 and the C-channel releasable fastener track second side may be on the keyboard layout structure 530.

FIG. 5C illustrates a peripheral input device data and power connector second side 586 of the multifunctional modular peripheral input device 550, within a peripheral input device fastener track second side 584 for operative coupling with a keyboard layout structure module data and power connector first side 585 on the keyboard layout structure module fastener track first side 583 of the keyboard layout structure module 530. However, the fastener track first side 583 and fastener track second side 584 in an embodiment may provide the same structure and functionality as a releasable docking module fastener track side (e.g., 582A shown in FIG. 5A) for operative coupling with a keyboard layout structure module side (e.g., 281 of FIG. 2A). The peripheral input device data and power connector second side 586 shown in FIG. 5C in an embodiment may provide the same structure and functionality as a docking module data and power connector side (582B shown in FIG. 5A) for operative coupling with a keyboard layout structure module data and power connector side on the keyboard layout structure 530.

The keyboard layout structure 530 in an embodiment may be operatively coupled to the multifunctional modular peripheral input device 550, via operative coupling between the keyboard layout structure module fastener track first side 583 on the keyboard layout structure module 530, and a peripheral input device fastener track second side 584 on the multifunctional modular peripheral input device 550. Such an operative coupling may further include contact between the keyboard layout structure module data and power connector first side 585 and a peripheral input device data and power connector second side 586, on the multifunctional modular peripheral input device 550. As described herein, the keyboard layout structure 530 in an embodiment may operatively couple with a multifunctional modular peripheral input device 550 via operative coupling between the first and second sides of the a peripheral input device fastener track 583 and 584, respectively, and contact between first and second sides of a peripheral input device data and power connector 585 and 586, respectively, for the transfer of power and data between the keyboard layout structure 530 and the multifunctional modular peripheral input device 550.

Although only one of each of the peripheral input device data and power connectors 585 and 586 are shown in FIG. 5C, there may be a plurality of such peripheral input device data and power connectors 585 and 586 within at least one of the respective peripheral input device fastener tracks 583 and 584 to accommodate flipping orientation of the multifunctional modular peripheral input device 550. For example, there may be one or more data and power connector first side 585 situated at either end of the peripheral input device fastener track first side 583 in one embodiment. In another embodiment, one or more of data and power connector second side 586 may be situated at either end of the peripheral input device fastener track second side 584. In still another example embodiment, the peripheral input device data and power connector first side 585 may be situated in the center of the peripheral input device fastener track first side 583, and the peripheral input device data and power connector second side 586 may be situated in the center of the peripheral input device fastener track second side 584. This may allow for operative coupling between the peripheral input device data and power connector first side 585 and the peripheral input device data and power connector second side 586 regardless of the orientation of the multifunctional modular peripheral input device 550, which may be situated with the touch pad 551 pointed upward or with the number pad 552 pointed upward.

In various embodiments herein, the multifunctional modular peripheral input device 550 may comprise one or a plurality of peripheral input devices, such as a touch pad 551 and a number pad 552. In an embodiment shown in FIG. 5C, a first peripheral input device, such as a touch pad 551, may be situated on a first surface of the multifunctional modular peripheral input device 550 and a second peripheral input device, such as a number pad 552, may be situated on a second surface. A user in such embodiments may enable functionality of the first 551 or second 552 of such peripheral input devices by orienting either the first surface or the second surface of the multifunctional modular peripheral input device 550 to point upward toward the user, respectively, prior to operative coupling with the keyboard layout structure 530.

The keyboard controller housed within the docking module in an embodiment may receive user input via a top-facing one of the peripheral input devices of the multifunctional modular peripheral input device 550 to register keystrokes or user touch input. The keyboard controller in such an embodiment may identify which of the peripheral input devices, such as the touch pad 551 or the number pad 552 is pointing upward toward the user and thus chosen for current use by the user based an orientation of the plurality of metal contacts 585a to 585n of the peripheral input device data and power connector first side 585 with respect to the plurality of metal contacts 586a to 586n of the peripheral input device data and power connector second side 586. For example, as shown in FIG. 5C, when the touch pad 551 is oriented upward with respect to the user, a first metal contact 585a of the peripheral input device data and power connector first side 585 may come into contact with the first metal contact 586a of the peripheral input device data and power connector second side 586. In such an embodiment, the keyboard controller may identify such a contact between the metal contacts 585a and 586a to recognize orientation of the multifunctional modular peripheral input device 550 with the touchpad 551 facing toward the user for current use.

As another example, when the number pad 552 is oriented upward with respect to the user, a first metal contact 585a of the peripheral input device data and power connector first side 585 may come into contact with the last metal contact 586n of the peripheral input device data and power connector second side 586. In such an embodiment, the keyboard controller may identify such a contact between the metal contacts 585a and 586n to recognize orientation of the multifunctional modular peripheral input device 550 with the number pad 552 facing toward the user for current use.

Figure 6:
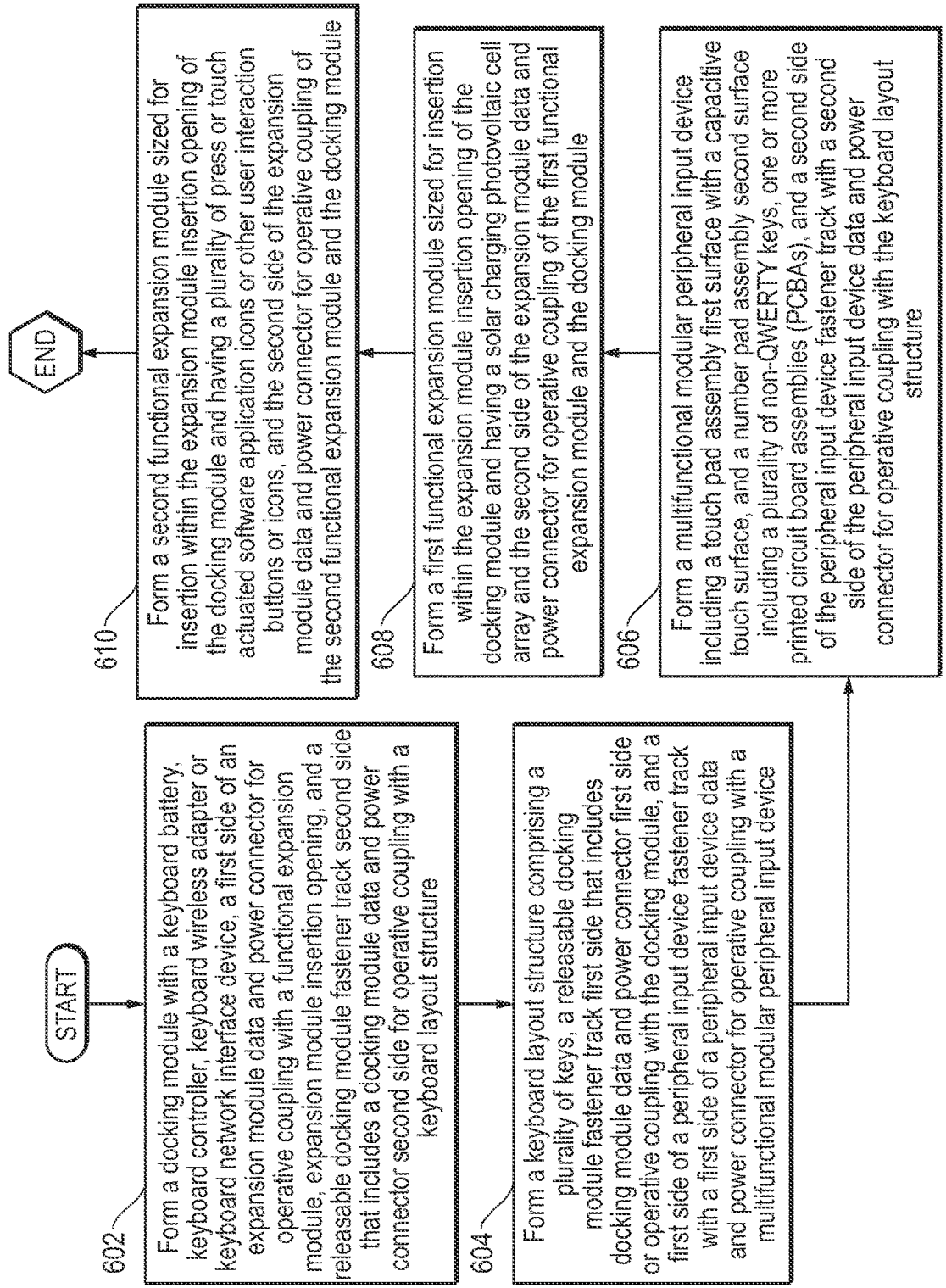
FIG. 6 is a flow diagram illustrating a method of forming components of a multifunctional upgradeable and expandable modular keyboard according to an embodiment of the present disclosure.

FIG. 6 is a flow diagram illustrating a method of forming components of a multifunctional upgradeable and expandable modular keyboard according to an embodiment of the present disclosure. As described herein, the multifunctional upgradeable and expandable modular keyboard in an embodiment may include a plurality of interchangeable multifunctional components that can be assembled together according to a plurality of available configurations to provide various functionalities. In such a way, the user may repair, or mix and match a plurality of different types of keyboard layout structure modules, a plurality of different docking modules, a plurality of different peripheral input devices, and a plurality of upgradeable additional functionalities of functional expansion modules, as the user's needs change or when repairs or replacement are needed throughout the lifetime of the multifunctional upgradeable and expandable modular keyboard.

At block 602, a docking module may be formed in an embodiment to include a keyboard battery, a keyboard controller, external port connectors for power or data, and a keyboard wireless adapter or keyboard network interface device. The docking module in an embodiment may further include an expansion module insertion opening and a first side of an expansion module data and power connector for operative coupling with an interchangeable functional expansion module. In an embodiment, the docking module may also include a second side of a docking module fastener track that includes a second side of a docking module data and power connector for operative coupling with a first side fastener track on a keyboard layout structure module. For example, in an embodiment described with reference to FIG. 2A, a multifunctional upgradeable and expandable modular keyboard 221 may include a docking module 240 housing a keyboard controller, keyboard battery, port connectors, a network interface device or wireless adapter for communication with an information handling system, and an opening for insertion of a interchangeable functional expansion module 290 having one of various functionalities. The docking module 240 may vary in configuration (e.g., wired or wireless) in an embodiment. Docking module 240 may operatively couple with one of a plurality of different types of keyboard layout structure modules 230 housing a plurality of keys 233 of various key types, via operative coupling with a releasable docking module fastener track first side 281 on the keyboard layout structure module 230. As also described in an embodiment with respect to FIG. 5A, the releasable docking module fastener track side 582A may include a docking module data and power connector side 582B for the transfer of power and data between the docking module 540 and the keyboard layout structure module 530.

The keyboard layout structure module fastener track on the keyboard layout structure module and the docking module fastener track may include a sliding track for slidable mounting within a socket. For example, the docking module side may comprise a C-channel sliding track socket on the docking module for insertion into a keyboard layout structure module fastener track side mounted to the keyboard layout structure module 530, which may comprise an H-channel sliding track. For example, the releasable docking module fastener track first side 582A of FIG. 5A may comprise a C-channel sliding track socket on docking module 240 for insertion therewithin of a fastener track second side (281 of FIG. 2A) mounted to the keyboard layout structure 530, which may comprise an H-channel sliding track. In other embodiments, the orientations of one or more of these H-channels and C-channels for these fastener tracks may be switched. In other words, the docking module fastener track side in such an embodiment may be an H-channel track housed on the docking module, for operative coupling with a C-channel keyboard layout structure module fastener track side mounted to the keyboard layout structure module 530. It is contemplated that other fasteners may be used in yet other embodiments to operatively couple these components, including magnets, latches, or screws, for example.

The keyboard layout structure module data and power connector and the docking module data and power connector may include a plurality of conductive contacts for transferring power and data between operatively coupled components. More specifically, the keyboard layout structure module data and power connector first side on the keyboard layout structure module 530 may comprise a first plurality of metal contacts for making conductive contact with a second plurality of metal contacts within a docking module data and power connector second side 582B on the docking module 540 of FIG. 5A. The metal contacts in docking module data and power connector 582A may be operatively coupled to the keyboard controller housed within the docking module 540 and any port connectors for outside power and data in an embodiment. One or both sides of metal contacts may be spring contacts.

In an embodiment at block 604, a keyboard layout structure module may be formed to comprise a plurality of keys and components such as an array of key switches as well as power and data connectivity connectors with other interchangeable keyboard modules and any backlighting or key mechanisms for the particular keyboard key types in an embodiment. Different types of keyboard layout structure modules 230 in various embodiments may include keys 233 having various types of key assemblies, such as haptic, dome, scissor, short-stroke, long stroke, or various key layouts. The keyboard layout structure module may have on another side a releasable docking module fastener track that includes another keyboard layout structure module data and power connector for operative coupling with a multifunctional modular peripheral input device on one side of the keyboard layout structure module. For example, the keyboard layout structure module 230 in an embodiment of FIG. 2A may also operatively couple with a multifunctional modular peripheral input device 250 via a fastener track side 283 mounted on the keyboard layout structure module 230.

In another example embodiment described with respect to FIGS. 5A, 5B, and 5C, the multifunctional modular peripheral device input device 550 may operatively couple with one of a plurality of different types of keyboard layout structure modules 530 via a peripheral input device fastener track side 584 on the multifunctional modular peripheral device input device 550. The peripheral input device fastener track side 584 on the multifunctional modular peripheral device input device 550 may operatively couple to another fastener track side 583 on the keyboard layout structure module 530 in an embodiment. The fastener track first side 583 on the keyboard layout structure module 530 and peripheral input device fastener track second side 584 on the multifunctional modular peripheral input device 550 may provide a slidable operative coupling between the two sides of the fastener track coupling. Either H-channel sliding track or a C-channel sliding track socket may comprise the fastener track first side 583 on the keyboard layout structure module 530 with the reciprocal type of fastener track side as the peripheral input device fastener track second side 584 on the multifunctional modular peripheral input device 550 according to embodiments herein.

The peripheral input device data and power connector side 586 on the peripheral input device fastener track second side 584 on the multifunctional modular peripheral input device 550 operatively couples to the data and power connector side 585 on the fastener track first side 583 on the keyboard layout structure module 530. The metal contacts in each of these first and second side of the data and power connector between the keyboard layout structure module 530 and the multifunctional modular peripheral input device 550 may be spring-loaded contact wires, contact wires, or contact pads that are operatively coupled to the components in the multifunctional modular peripheral input device 550 and the keyboard layout structure module 530 in an embodiment.

At block 606, a multifunctional modular peripheral input device may be formed in an embodiment to include one or more printed circuit board assemblies (PCBs) for processing input from one or more of a touch pad or a number pad or another peripheral input device on the multifunctional modular peripheral input device in various embodiments.

For example, the multifunctional modular peripheral input device may include a touch pad assembly first surface with a capacitive touch surface, and a number pad second surface, including a plurality of non-QWERTY keys in an embodiment. The multifunctional modular peripheral input device in an embodiment may further include a side of a peripheral input device fastener track with a peripheral input device data and power connector for operative coupling with the keyboard layout structure. For example, in an embodiment described with reference to FIG. 2A, a multifunctional modular peripheral input device 250 may comprise one or more peripheral input devices, such as a touch pad 251 or a number pad. In a particular embodiment, a first peripheral input device, such as a touch pad 251, may be situated on a first surface of the multifunctional modular peripheral input device 250. In another embodiment, a second peripheral input device 252, such as a number pad, may be situated on a second surface of the multifunctional modular peripheral input device 250.

In other example embodiments described with respect to FIGS. 2B and 2C, a multifunctional modular peripheral input device 250 may be formed in an embodiment to include a touch pad assembly first surface 251 with a capacitive touch surface, and a number pad second surface 252, including a plurality of non-QWERTY keys 253. A user in an embodiment may enable functionality of the number pad 252 by orienting the second surface number pad 252 of the multifunctional modular peripheral device 250 to point upward toward the user, prior to operative coupling with the keyboard layout structure module 230. In another aspect of an embodiment, a user in an embodiment may enable functionality of the touch pad 251 by orienting the first surface touch pad 251 of the multifunctional modular peripheral device 250 to point upward toward the user, prior to operative coupling with the keyboard layout structure module 230. In another example embodiment described with respect to FIGS. 4A and 4B, the multifunctional modular peripheral input device 450 in an embodiment may further include a second side of a peripheral input device fastener track 484 for operative coupling with a first side of the peripheral input device fastener track (283 of FIG. 2A) of the keyboard layout structure.

In still other example embodiments described with reference to FIGS. 5A, 5B, and 5C the peripheral input device fastener track and the keyboard layout structure module fastener track may include a fastener sliding track slidably mounted within a fastener sliding track socket. For example, the keyboard layout structure fastener track side 583 may comprise a C-channel sliding track socket mounted to the keyboard layout structure module 530 for insertion therewithin of a peripheral input device fastener track second side 584, which may comprise an H-channel sliding track mounted to the multifunctional modular peripheral input device 550.

In other embodiments, the orientations of one or more of these H-channels and C-channels for these fastener tracks may be switched. In other words, the keyboard layout structure module fastener track side 583 in such an embodiment may be an H-channel track on the keyboard layout structure module 530, for operative coupling with a C-channel peripheral input device fastener track second side 584 mounted to the multifunctional modular peripheral input device 550, as described herein with respect to FIG. 5C.

The peripheral input device data and power connector first side 585 may be mounted to the keyboard layout structure module 530 on the fastener track side 583 may comprise a first plurality of metal contacts 585a to 585n for making conductive contact with a second plurality of metal contacts 586a to 586n within a peripheral input device data and power connector second side 586 on the fastener track side 584 on the multifunctional modular peripheral input device 550. It is contemplated that other fasteners may be used to operatively couple the multifunctional modular peripheral input device 550 with the keyboard layout structure module 530, including magnets, latches, or screws, for example.

Assembly of the multifunctional upgradeable and expandable modular keyboard 521 in an embodiment may begin with partial insertion of a keyboard layout structure module fastener track second (281 of FIG. 2A) within a releasable docking module fastener track first side (582a of FIG. 5A) of docking module 540 such that the keyboard layout structure 530 may slide generally horizontally with reference to the docking module 540. The keyboard layout structure module 530 in an embodiment may further include another input device fastener track side such as 583 in FIG. 5B or 5C for operative coupling with a multifunctional modular peripheral input device 550.

A first interchangeable functional expansion module may be formed in an embodiment at block 608 such that it is sized for insertion within the expansion module insertion opening of the docking module. The expansion module insertion opening has a first side of an expansion module data and power connector disposed therein. In an embodiment, the first interchangeable functional expansion module may include a solar charging photovoltaic cell array for charging the keyboard rechargeable battery housed within the docking module. The first interchangeable functional expansion module in an embodiment may also include a second side of the expansion module data and power connector for operative coupling of the first interchangeable functional expansion module and the docking module. For example, in an embodiment described with reference to FIG. 2A, a user may configure the multifunctional upgradeable and expandable modular keyboard 221 to include various additional functionalities, such as a touch icon panel or a solar charging panel, by insertion of one of a plurality of available interchangeable functional expansion modules 290 within the docking module 240. Each of the interchangeable functional expansion modules 290 may provide a separate functionality and may have a universal size, shape, and connectivity for operative coupling with the docking module 240 in an embodiment. For example, the interchangeable functional expansion module 290 in an embodiment described with respect to FIG. 2A may include a photovoltaic cell array for solar charging and recharging of a keyboard battery housed within the docking module 240. The interchangeable functional expansion module 290 in an embodiment may be operatively coupled with the docking module 240 through insertion within an opening of the docking module 240 sized to receive the interchangeable functional expansion module 290 and via an expansion module data and power connector for transfer of data and power between the interchangeable functional expansion module 290 and the docking module 240.

In another example embodiment described with respect to FIG. 3A, a first interchangeable functional expansion module 390A may be formed such that it is sized for insertion within the expansion module insertion opening 392 of the docking module 340. In an embodiment, the first interchangeable functional expansion module 390A may include a solar charging photovoltaic cell array for charging the keyboard rechargeable battery housed within the docking module 340. The first interchangeable functional expansion module 390A in an embodiment may also include a second side of the expansion module data and power connector 391 for operative coupling of the first interchangeable functional expansion module 390A and the docking module 340. The docking module 340 in an embodiment may further house a first side of the expansion module data and power connector for operative coupling with the second side of the expansion module data and power connector 391 to enable the transfer of power and data between the docking module 340 and the first interchangeable functional expansion module 390A. Upon insertion of the first interchangeable functional expansion module 390A within the expansion module insertion opening 392, a plurality of magnets or ferromagnetic plates may fasten the first interchangeable functional expansion module 390A to the docking module 340 in an embodiment.

In an embodiment at block 610, a second interchangeable functional expansion module may be formed such that it is sized for insertion within the expansion module insertion opening of the docking module. The second interchangeable functional expansion module in an embodiment may include a plurality of press or touch actuated software application icons or other interaction buttons or icons. The second interchangeable functional expansion module in an embodiment may also include a second side of the expansion module data and power connector for operative coupling of the second interchangeable functional expansion module and the docking module. For example, in an embodiment described with respect to FIG. 2C, a second interchangeable functional expansion module 290B may be formed such that it is sized for insertion within the expansion module insertion opening of the docking module 240. The second interchangeable functional expansion module 290B in an embodiment may include a plurality of press or touch actuated software application icons or other interaction buttons or icons.

In another example embodiment described with respect to FIG. 3B, a second interchangeable functional expansion module 390B may be formed such that it is sized for insertion within the expansion module insertion opening 392 of the docking module 340. In an embodiment, the second interchangeable functional expansion module 390B housed within the docking module 340 and may include a plurality of touch actuated icons or buttons representing functionality of one or more software applications executing at a processor of the information handling system. The second interchangeable functional expansion module 390B in an embodiment may also include a second side of the expansion module data and power connector 391 for operative coupling of the second interchangeable functional expansion module 390B and the docking module 340. The docking module 340 in an embodiment may further house a first side of the expansion module data and power connector for operative coupling with the second side of the expansion module data and power connector 391 to enable the transfer of power and data between the docking module 340 and the second interchangeable functional expansion module 390B. Upon insertion of the second interchangeable functional expansion module 390B within the expansion module insertion opening 392, a plurality of magnets or ferromagnetic plates may fasten the second interchangeable functional expansion module 390B to the docking module 340.

In such a way, the user may easily repair or mix and match a plurality of different types of keyboard layout structures, a plurality of different docking modules, a plurality of different peripheral input devices, and a plurality of upgradeable additional functionalities of functional expansion modules, as the user's needs change or repairs are necessary throughout the lifetime of the multifunctional upgradeable and expandable modular keyboard. The method for forming components of a multifunctional upgradeable and expandable modular keyboard according to an embodiment of the present disclosure may then end.

Figure 7:
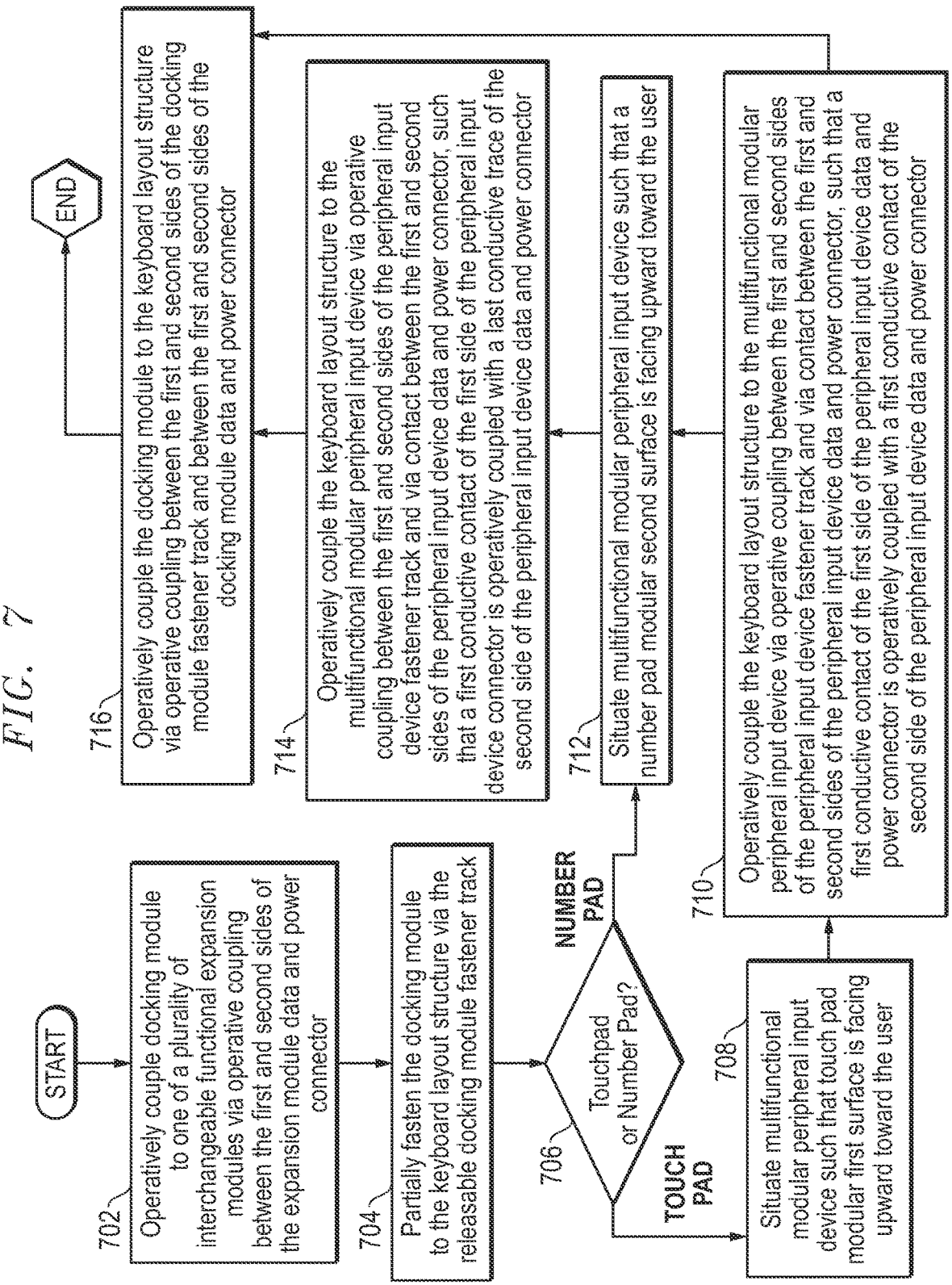
FIG. 7 is a flow diagram illustrating a method of assembling components of a multifunctional upgradeable and expandable modular keyboard according to an embodiment of the present disclosure.

FIG. 7 is a flow diagram illustrating a method of assembling components of a multifunctional upgradeable and expandable modular keyboard according to an embodiment of the present disclosure. As described herein, the multifunctional upgradeable and expandable modular keyboard in an embodiment may be assembled through operative coupling of a plurality of interchangeable multifunctional components according to a plurality of available configurations to provide various functionalities. In such a way, the user may repair or mix and match a plurality of different types of keyboard layout structure modules, a plurality of different docking modules, a plurality of different peripheral input devices, and a plurality of upgradeable additional functionalities of functional expansion modules, as the user's needs change or as repairs are needed throughout the lifetime of the multifunctional upgradeable and expandable modular keyboard.

At block 702, a docking module may be operatively coupled to one of a plurality of interchangeable functional expansion modules via operative coupling between first and second sides of an expansion module data and power connector. For example, in embodiments described with reference to FIGS. 3A and 3B, the docking module 340 may be operatively coupled to one of a plurality of interchangeable functional expansion modules, including a solar panel interchangeable functional expansion module 390A, or a touch icon interchangeable functional expansion module 390B, via operative coupling between first and second sides of an expansion module data and power connector 391. A plurality of magnets or corresponding ferromagnetic plates within the expansion module insertion opening 392 and on the first interchangeable functional expansion module 390A may fasten the first interchangeable functional expansion module 390A to the docking module 340. In another embodiments, the first interchangeable functional expansion module 390A or second interchangeable functional expansion module 390B may fasten to the docking module 340 via an interference or friction fit, latch, hooks, clips or other fasteners.

The docking module may be partially fastened to a keyboard layout structure in an embodiment at block 704, via a releasable docking module fastener track. For example, in an embodiment described with reference to FIG. 5A, assembly of the multifunctional upgradeable and expandable modular keyboard 521 in an embodiment may begin with partial insertion of a releasable docking module fastener track side 582A on a docking module 540 within a releasable fastener track second side (e.g., 281 of FIG. 2A) on the keyboard layout structure module 530 such that the keyboard layout structure module 530 may slide generally horizontally with reference to the docking module 540. This insertion may be considered partial in the embodiment described as shown in FIG. 2A so that a multifunctional modular peripheral input device 250 may slidingly couple to another fastener track coupling to keyboard layout structure module 230 in an embodiment. Then the keyboard layout structure module 230 operatively coupled with multifunctional modular peripheral input device 250 may finish slidingly coupling to docking module 250 as shown in FIG. 5B or 5C, because the left side of the keyboard layout structure 230 meets or lies flush with the left side of the docking module 240. Alternatively, the opposite left to right orientation of the keyboard layout structure module 230 operatively coupled with multifunctional modular peripheral input device 250 where right side of the multifunctional modular peripheral input device 250 aligns with the right side of the docking module 240.

At block 706, one of two available functionalities of a multifunctional modular peripheral input device may be chosen for a current configuration of the multifunctional upgradeable and expandable modular keyboard in an embodiment. For example, in an embodiment described with reference to FIG. 5C, the keyboard layout structure module 530 in an embodiment may operatively couple with a multifunctional modular peripheral input device 550 via sliding together the first and second sides of the peripheral input device fastener track 583 and 584, respectively, and contact between first and second sides of a peripheral input device data and power connector 585 and 586, respectively, for the transfer of power and data between the keyboard layout structure 530 and the multifunctional modular peripheral input device 550. In some embodiments herein, the multifunctional modular peripheral input device 550 may comprise a plurality of peripheral input devices on the same unit, such as a touch pad 551 and a number pad 552. In an embodiment shown in FIG. 5C, a first peripheral input device, such as a touch pad 551, may be situated on a first surface of the multifunctional modular peripheral input device 550 and a second peripheral input device, such as a number pad 552, may be situated on a second surface. A user in such embodiments may enable functionality of either the first 551 or second 552 of such peripheral input devices by orienting either the first surface or the second surface of the multifunctional modular peripheral device 550 to point upward toward the user, respectively, at block 706. This occurs prior to operative coupling the multifunctional modular peripheral device 550 with the keyboard layout structure module 530 via the faster track on the side of keyboard layout structure module 530. If the multifunctional modular peripheral device 550 is to be installed with a touchpad side facing up toward the user, flow may proceed to block 708. If the multifunctional modular peripheral device 550 is to be installed with the number pad side facing up toward the user, flow may proceed to block 712.

In an embodiment in which touch pad functionality is chosen for the current configuration of the multifunctional upgradeable and expandable modular keyboard, the multifunctional modular peripheral input device at block 708 may be situated such that the touch pad first surface is facing upward toward the user. For example, in an embodiment described with reference to FIG. 2A, the user in such an embodiment may enable functionality of the first or second of such peripheral input devices by orienting a choice of a first surface of the multifunctional modular peripheral device 250 to point upward toward the user, respectively, prior to operative coupling with the keyboard layout structure 230. In another example embodiment described with reference to FIG. 4A, a user may enable functionality of the touch pad 451 by orienting the surface touch pad 451 of the multifunctional modular peripheral device 450 to point upward toward the user, prior to operative coupling with the keyboard layout structure. The keyboard controller in an embodiment described with reference to FIG. 5C may identify which of the peripheral input devices, namely the touch pad 551 surface instead of the number pad 552 is pointing upward toward the user based on orientation of engagement of a power and data connector in the fastener track or which power and data connector in the fastener track is engaged between the keyboard layout structure module 530 and the multifunctional modular peripheral device 550. The side chosen may be indicated for current use by the user based an orientation of the plurality of metal contacts 585*a* to 585*n* of the peripheral input device data and power connector first side 585 with respect to the plurality of metal contacts 586*a* to 586*n* of the peripheral input device data and power connector second side 586 in one embodiment. In another embodiment, multiple peripheral input device data and power connectors 585 or 586 may be situated along either side or both sides of the fastener track sides 583 and 584.

At block 710, the keyboard layout structure in an embodiment may be operatively coupled to the multifunctional modular peripheral input device oriented for use as a touch pad, via operative coupling between the first and second sides of the peripheral input device fastener track and between the first and second sides of the peripheral input device data and power connector. In an embodiment, the first conductive contact of the first side of the peripheral input device data and power connector may be placed in contact with a first conductive contact of the second side of the peripheral input device data and power connector due to the touch pad being situated to face upward toward the user. With this operative coupling and conductive contact component, the keyboard controller in the docking module will operate with the touchpad peripheral input device. For example, in an embodiment described with reference to FIG. 5A, the keyboard layout structure module 530 may be operatively coupled to the multifunctional modular peripheral input device 550, which may be oriented for use as a touch pad 551 as shown in FIG. 5A. Such an operative coupling may include contact between the first and second sides of the peripheral input device fastener track, for slidable movement of the multifunctional modular peripheral input device 550 with respect to the keyboard layout structure module 530 to operatively couple them with the fastener track.

In other example embodiments described with reference to FIGS. 5B and 5C, the keyboard layout structure module 530 may be operatively coupled to the multifunctional modular peripheral input device 550 and oriented for use as a touch pad 551, via operative coupling between the fastener track first side 583 on the keyboard layout structure module 530 and a peripheral input device fastener track second side 584 on the multifunctional modular peripheral input device 550. Such an operative coupling may further include contact between the peripheral input device data and power connector first side 585 mounted on the fastener track first side 583 of the keyboard layout structure 530 and a peripheral input device data and power connector second side 586 mounted on the peripheral input device fastener track side 584 on the multifunctional modular peripheral input device 550.

The keyboard controller housed within the docking module in an embodiment may receive user input via a top-facing one of the peripheral input devices of the multifunctional modular peripheral input device 550 to register user touch input. The keyboard controller may determine the touchpad peripheral input device selection may be based on the line up of the contacts pins or pads of the peripheral input device data and power connector first side 585 and the peripheral input device data and power connector second side 586 or which of a plurality of peripheral input device data and power connectors on the fastener track are engaged when the multifunctional modular peripheral device 550 is installed. The keyboard controller in such an embodiment may identify which of the peripheral input device options, such as the touch pad 551 or the number pad 552 is pointing upward toward the user and thus chosen for current use by the user based an orientation of the plurality of metal contacts 585a to 585n of the peripheral input device data and power connector first side 585 with respect to the plurality of metal contacts 586a to 586n of the peripheral input device data and power connector second side 586 in one embodiment. For example, as shown in FIG. 5C, when the touch pad 551 is oriented upward with respect to the user, a first metal contact 585a of the peripheral input device data and power connector first side 585 may come into contact with the first metal contact 586a of the peripheral input device data and power connector second side 586. In such an embodiment, the keyboard controller may identify such a contact between the metal contacts 585a and 586a to recognize orientation of the multifunctional modular peripheral input device 550 with the touchpad 551 facing toward the user for current use. The method may then proceed to block 716 for operative coupling of the keyboard layout structure to the docking module.

In an embodiment in which number pad functionality is chosen for the current configuration of the multifunctional upgradeable and expandable modular keyboard at block 706, flow proceeds to block 712 where the multifunctional modular peripheral input device may be situated such that the number pad second surface is facing upward toward the user. For example, in an embodiment described with reference to FIG. 4B, a user may enable functionality of the number pad 452 by orienting the second surface number pad 452 of the multifunctional modular peripheral device 450 to point upward toward the user, prior to operative coupling with the keyboard layout structure.

At block 714, the keyboard layout structure in an embodiment may be operatively coupled to the multifunctional modular peripheral input device oriented for use as a number pad via operative coupling between the first and second sides of the peripheral input device fastener track and between the first and second sides of the peripheral input device data and power connector. In an embodiment, the first conductive contact of the first side of the peripheral input device data and power connector on the keyboard layout structure module may be placed in contact with a last conductive contact of the second side of the peripheral input device data and power connector on the multifunctional modular peripheral device due to the number pad being situated to face upward toward the user. In other embodiments, there may be plural peripheral input device data and power connectors in the fastener track on either the keyboard layout structure module side or the multifunctional modular peripheral device side. Which one of the plural peripheral input device data and power connectors that is engaged may indicate that the number pad is facing up in other embodiments.

For example, in embodiments described with reference to FIGS. 5B and 5C, keyboard layout structure module 530 in an embodiment may be operatively coupled to the multifunctional modular peripheral input device 550 oriented for use as a touch pad 551, via operative coupling between the peripheral input device fastener track first side 583, housed within or mounted to the keyboard layout structure 530, and a peripheral input device fastener track second side 584, housed within or mounted to the multifunctional modular peripheral input device 550. Such an operative coupling may further include contact between the peripheral input device data and power connector first side 585, housed within or mounted to the keyboard layout structure 530, and one of a plurality of peripheral input device data and power connector second sides 586, housed within or mounted to the multifunctional modular peripheral input device 550 in one embodiment or an inverted peripheral input device data and power connector second side 586 in other embodiments. In a latter embodiment, when the number pad 552 is oriented upward with respect to the user, a first metal contact 585a of the peripheral input device data and power connector first side 585 may come into contact with the last metal contact 586n of the peripheral input device data and power connector second side 586. In such an embodiment, the keyboard controller may identify such a contact between the metal contacts 585a and 586n to recognize orientation of the multifunctional modular peripheral input device 550 with the number pad 552 facing toward the user for current use. The method may then proceed to block 716 for operative coupling of the keyboard layout structure to the docking module.

The docking module in an embodiment may be operatively coupled to the keyboard layout structure at block 716 via full contact between the first and second sides of the docking module fastener track and the first and second sides of the docking module data and power connector. For example, in an embodiment described with reference to FIG. 5A, the multifunctional modular peripheral input device 550 may be fully operatively connected with the keyboard layout structure module 530, such that the front edge of the multifunctional modular peripheral input device 550 is parallel to or flush with the front edge of the keyboard layout structure module 530. Upon such full operative coupling of the multifunctional modular peripheral input device 550 with the keyboard layout structure module 530 in an embodiment, the docking module may be fully operatively coupled to the keyboard layout structure module 530 by sliding the keyboard layout structure module 530 and the multifunctional modular peripheral input device 550 to the left such that the left side of the docking module 540 lies flush with the left side of the keyboard layout structure 530. In an opposite orientation embodiment, the multifunctional modular peripheral input device 550 may be situated to the left of the keyboard layout structure 530 and full operative coupling may occur when the right side of the keyboard layout structure module 530 aligns with the right side of the docking module 540.

Such a positioning of the docking module 540 with respect to the keyboard layout structure 530 may ensure full contact between the first and second sides of the docking module fastener track, including 582A, and the first and second sides of the docking module data and power connector, including 582B. It is contemplated that the docking module data and power connector 582B may be located anywhere along docking module fastener track 582A with corresponding reciprocal data and power connector located on the fastener track of the keyboard layout structure module 530 in various embodiments. The keyboard controller in an embodiment may identify which of the peripheral input devices, such as the touch pad 551 or the number pad 552 is pointing upward toward the user and thus chosen for current use by the user based which peripheral input device data and power connector is engaged or an orientation of the plurality of metal contacts 585a to 585n of the peripheral input device data and power connector first side 585 with respect to the plurality of metal contacts 586a to 586n of the peripheral input device data and power connector second side 586 as described in embodiments herein. The keyboard controller may signal a hardware processor of the information handling system to execute a device driver software for the identified peripheral input device chosen. In such a way, the user may repair or mix and match a plurality of different types of keyboard layout structures, a plurality of different peripheral input devices, a plurality of different docking modules, and a plurality of upgradeable additional functionalities of functional expansion modules, as the user's needs change or repairs become necessary throughout the lifetime of the multifunctional upgradeable and expandable modular keyboard. The method for assembling components of a multifunctional upgradeable and expandable modular keyboard according to an embodiment of the present disclosure may then end.

The blocks of the flow diagram of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A multifunctional upgradeable and expandable modular keyboard for an information handling system comprising:
    a keyboard layout structure module having a plurality of keys and operatively coupled to a docking module to detect and communicate to the docking module an indication of keystrokes actuated by a user, where the operative coupling includes a docking module data and power connector and a first releasable docking module fastener track;
    the keyboard layout structure module operatively coupled to a multifunctional modular peripheral input device via a second peripheral input device fastener track;
    the docking module housing a keyboard controller for communication of the keystrokes to the information handling system and a keyboard battery for powering the keyboard controller;
    the docking module having a data and power connector first side on the docking module to operatively couple to a data and power connector second side on the keyboard layout structure module to form the docking module data and power connector for transfer of data and power between the docking module and the keyboard layout structure module; and
    the docking module having a releasable docking module fastener track first side on the docking module to operatively couple the docking module to a releasable docking module fastener track second side on the keyboard layout structure module to form the first releasable docking module fastener track, where the releasable docking module fastener track first side slidingly couples to the releasable docking module fastener track second side.

2. The multifunctional upgradeable and expandable modular keyboard of claim 1, wherein the releasable docking module fastener track first side is a C-channel sliding track socket and the releasable docking module fastener track second side is an H-channel sliding track for slidingly coupling within the releasable docking module fastener track first side.

3. The multifunctional upgradeable and expandable modular keyboard of claim 1, wherein the releasable docking module fastener track first side is an H-channel sliding track and the releasable docking module fastener track second side is a C-channel sliding track socket for slidingly coupling with the releasable docking module fastener track first side.

4. The multifunctional upgradeable and expandable modular keyboard of claim 1 further comprising:
    the releasable docking module fastener track first side is an H-channel sliding track with the docking module data and power connector first side mounted thereon, where the docking module data and power connector first side comprises a first plurality of spring-loaded conductive contacts;
    the first plurality of spring-loaded contacts contacting a second plurality of spring-loaded conductive contacts comprising the docking module data and power connector second side that is mounted to the releasable docking module fastener track second side when the keyboard layout structure module is installed with the docking module.

5. The multifunctional upgradeable and expandable modular keyboard of claim 1 further comprising:
    the multifunctional modular peripheral input device including a touch pad assembly for capacitive touch sensing on a first surface of the multifunctional modular peripheral input device and a number pad assembly on a second surface of the multifunctional modular peripheral input device.

6. The multifunctional upgradeable and expandable modular keyboard of claim 1 further comprising:
    the keyboard layout structure module having a peripheral input device data and power connector first side to operatively couple to a peripheral input device data and power connector second side on the multifunctional modular peripheral input device for transfer of data and power between the keyboard layout structure module and the multifunctional modular peripheral input device.

7. The multifunctional upgradeable and expandable modular keyboard of claim 1 further comprising:
    the keyboard layout structure module having a peripheral input device fastener track first side to operatively couple to a peripheral input device fastener track second side on the multifunctional modular peripheral input device.

8. The multifunctional upgradeable and expandable modular keyboard of claim 1 further comprising:
the docking module including an expansion module insertion opening sized for insertion of an interchangeable functional expansion module providing additional functional structures operatively coupled to the docking module via an expansion module data and power connector for communication of power and user input between the interchangeable functional expansion module and the docking module.

9. A method of assembling a multifunctional upgradeable and expandable modular keyboard for an information handling system comprising:
operatively coupling a keyboard layout structure module to a multifunctional modular peripheral input device by sliding together plural sides of a peripheral input device fastener track, where the keyboard layout structure module has a peripheral input device fastener track first side and a peripheral input device data and power connector first side;
operatively coupling the peripheral input device data and power connector first side, including a first plurality of spring-loaded conductive contacts on the keyboard layout structure module to a peripheral input device data and power connector second side on a multifunctional modular peripheral input device, including a second plurality of spring-loaded conductive contacts for transfer of data and power between the keyboard layout structure module and the multifunctional modular peripheral input device;
operatively coupling the keyboard layout structure module having a plurality of keys to a docking module to detect and communicate, via a keyboard controller housed within the docking module, keystroke input data from keys actuated by a user, where the operative coupling includes engaging a docking module data and power connector by sliding together plural sides of a releasable docking module fastener track; and
operatively coupling a docking module data and power connector first side on the keyboard layout structure module to a docking module data and power connector second side on the docking module to engage the docking module data and power connector for transfer of data and power between the docking module and the keyboard layout structure module.

10. The method of claim 9 further comprising:
orienting a first surface including a first peripheral input device situated to face a user via sliding together the peripheral input device fastener track such that a first peripheral input device data and power connector second side of a plurality of peripheral input device data and power connector second sides mounted on the multifunctional modular peripheral input device engages the peripheral input device data and power connector first side on the keyboard layout structure module to indicate to the keyboard controller that the first peripheral input device of a plurality of peripheral input devices on the multifunctional modular peripheral input device is situated to face the user.

11. The method of claim 9, wherein the multifunctional modular peripheral input device includes first peripheral input device on a first surface comprising a touch pad assembly for capacitive touch sensing and a second peripheral input device on an opposite, second surface comprising a number pad.

12. The method of claim 11 further comprising:
operatively decoupling the keyboard layout structure module from the multifunctional modular peripheral input device, via sliding apart the plural sides of the peripheral input device fastener track and decoupling the peripheral input device data and power connector second side of the multifunctional modular peripheral input device;
orienting the second surface of the multifunctional modular peripheral input device having a second peripheral input device to face a user; and
operatively coupling the multifunctional modular peripheral input device to the keyboard layout structure module, via sliding together the plural sides of the peripheral input device fastener track and decoupling the peripheral input device data and power connector second side of the multifunctional modular peripheral input device.

13. The method of claim 9 wherein the plural sides of the peripheral input device fastener track includes a C-channel sliding track socket and an H-channel sliding track.

14. The method of claim 9 wherein the plural sides of the releasable docking module fastener track includes a C-channel sliding track socket and an H-channel sliding track.

15. The method of claim 9 further comprising:
operatively coupling the docking module to an interchangeable functional expansion module disposed within an expansion module insertion opening of the docking module providing additional functional structures operatively coupled to the docking module via an expansion module data and power connector for communication of power and data between the docking module and the interchangeable functional expansion module.

16. A multifunctional upgradeable and expandable modular keyboard for an information handling system comprising:
a keyboard layout structure module having a plurality of keys, operatively coupled to a docking module to detect and communicate to the docking module keystroke input data from keys actuated by a user, where the operative coupling includes a docking module data and power connector within a releasable docking module fastener track and the releasable docking module fastener track includes a C-channel sliding track socket and an H-channel sliding track;
the keyboard layout structure module operatively coupled to a multifunctional modular peripheral input device via a peripheral input device fastener track and a peripheral input device data and power connector in the peripheral input device fastener track, where the peripheral input device fastener track includes a C-channel sliding track socket and an H-channel sliding track;
the docking module including a keyboard controller for communication of the keystroke input data to the information handling system and a rechargeable keyboard battery for powering the keyboard controller; and
the docking module including an expansion module insertion opening sized for insertion of a first interchangeable functional expansion module selected from a plurality of available functional expansion modules compatible to the expansion module insertion opening and operatively coupled to the first interchangeable functional expansion module via an expansion module data and power connector.

17. The multifunctional upgradeable and expandable modular keyboard of claim 16 further comprising:

the expansion module insertion opening sized for insertion of the first interchangeable functional expansion module includes a plurality of magnets to operatively couple the first interchangeable functional expansion module in the expansion module insertion opening via magnets or ferromagnetic plates on the first interchangeable functional expansion module.

18. The multifunctional upgradeable and expandable modular keyboard of claim 16 further comprising:
the docking module having an expansion module data and power connector for operative coupling data and power with the first interchangeable functional expansion module.

19. The multifunctional upgradeable and expandable modular keyboard of claim 16 further comprising:
the first interchangeable functional expansion module including a solar charging photovoltaic cell array for charging of the rechargeable battery by the solar charging photovoltaic cell array.

20. The multifunctional upgradeable and expandable modular keyboard of claim 16 further comprising:
the first interchangeable functional expansion module including a plurality of touch actuated icons operatively coupled to the docking module.

\* \* \* \* \*